United States Patent
Loghmani et al.

(10) Patent No.: US 12,141,845 B2
(45) Date of Patent: Nov. 12, 2024

(54) COLLABORATIVE ADVERTISING MECHANISM

(71) Applicant: Lemon Inc., Grand Cayman (KY)

(72) Inventors: Masoud Loghmani, Los Angeles, CA (US); Mengyun Wang, Beijing (CN); Yanli Li, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 81 days.

(21) Appl. No.: 17/484,652

(22) Filed: Sep. 24, 2021

(65) Prior Publication Data
US 2023/0098735 A1    Mar. 30, 2023

(51) Int. Cl.
| G06Q 30/00 | (2023.01) |
| G06Q 30/0241 | (2023.01) |
| G06Q 30/0242 | (2023.01) |
| G06Q 50/00 | (2012.01) |
| H04L 65/60 | (2022.01) |

(52) U.S. Cl.
CPC ..... *G06Q 30/0277* (2013.01); *G06Q 30/0243* (2013.01); *G06Q 30/0244* (2013.01); *G06Q 30/0246* (2013.01); *G06Q 50/01* (2013.01); *H04L 65/60* (2013.01)

(58) Field of Classification Search
CPC ........... G06Q 30/0277; G06Q 30/0243; G06Q 30/0244; G06Q 30/0246; G06Q 50/01
See application file for complete search history.

(56) References Cited

U.S. PATENT DOCUMENTS

| 8,392,350 B2 * | 3/2013 | Brooks | G06Q 30/0643 |
| | | | 706/45 |
| 8,589,332 B2 * | 11/2013 | Brooks | G06Q 30/0643 |
| | | | 706/45 |

(Continued)

FOREIGN PATENT DOCUMENTS

| KR | 2019-0118776 A | 10/2019 | |
| WO | WO-2011075409 A1 * | 6/2011 | ............. G06Q 30/02 |
| WO | WO-2015066230 A1 * | 5/2015 | ......... G06Q 30/0201 |

OTHER PUBLICATIONS

Hilde A. M. Voorveld et al. "Engagement with Social Media and Social Media Advertising: The Differentiating Role of Platform Type." (Feb. 13, 2018). Retrieved online Oct. 19, 2023. https://www.tandfonline.com/doi/full/10.1080/00913367.2017.1405754 (Year: 2018).*

(Continued)

*Primary Examiner* — James A Reagan
(74) *Attorney, Agent, or Firm* — BakerHostetler

(57) ABSTRACT

The present disclosure describes techniques of implementing a collaborative advertising mechanism. The techniques comprise receiving a plurality of pieces of content associated with a mission event from a first plurality of client computing devices associated with a first plurality of users, evaluating the plurality of pieces of content based on one or more predetermined rules of the mission event and information indicative of viewer reactions to the plurality of pieces of content, determining at least one subset of the plurality of pieces of content based on a plurality of evaluation results corresponding to the plurality of pieces of content and user input from a client computing device associated with one of a second plurality of users, and distributing the at least one subset of the plurality of pieces of content.

17 Claims, 14 Drawing Sheets

(56) References Cited

U.S. PATENT DOCUMENTS

| | | | | |
|---|---|---|---|---|
| 9,542,693 | B2* | 1/2017 | Brooks | G06N 5/02 |
| 9,553,650 | B2* | 1/2017 | Ponnuswamy | H04B 7/0686 |
| 9,990,649 | B2* | 6/2018 | Sterns | G06Q 30/0242 |
| 10,242,412 | B2* | 3/2019 | Deng | G06Q 50/01 |
| 10,277,711 | B2* | 4/2019 | Shribman | H04L 67/06 |
| 10,338,767 | B2* | 7/2019 | Clediere | H04L 51/52 |
| 10,523,624 | B2* | 12/2019 | Lambert | G06Q 10/107 |
| 10,657,556 | B1* | 5/2020 | Lu | G06N 20/00 |
| 10,911,801 | B1* | 2/2021 | Antony | H04N 21/6334 |
| 10,955,990 | B2* | 3/2021 | Clediere | H04L 51/52 |
| 11,087,369 | B1 | 8/2021 | Bapna et al. | |
| 11,270,333 | B1* | 3/2022 | Lu | G06Q 30/0243 |
| 11,375,344 | B2* | 6/2022 | Ong | H04W 4/40 |
| 11,556,221 | B2* | 1/2023 | Amitay | H04L 51/52 |
| 11,681,933 | B2* | 6/2023 | Herz | G06Q 30/0255 706/12 |
| 2003/0196056 | A1* | 10/2003 | Vishlitzky | G06F 11/1435 714/E11.136 |
| 2007/0006250 | A1* | 1/2007 | Croy | H04H 60/44 348/E7.072 |
| 2008/0040175 | A1* | 2/2008 | Dellovo | G06Q 30/0245 705/7.29 |
| 2008/0086361 | A1* | 4/2008 | Eliezerov | G06Q 30/0203 705/7.32 |
| 2008/0270223 | A1 | 10/2008 | Collins et al. | |
| 2009/0012927 | A1* | 1/2009 | Brooks | G06Q 30/02 706/52 |
| 2009/0018917 | A1* | 1/2009 | Chapman | G06Q 30/0277 705/14.46 |
| 2010/0250477 | A1* | 9/2010 | Yadav | G06N 20/00 706/14 |
| 2010/0313009 | A1* | 12/2010 | Combet | H04L 63/0421 709/224 |
| 2012/0071116 | A1* | 3/2012 | Gong | H04B 7/0408 455/114.2 |
| 2012/0150763 | A1 | 6/2012 | Andino, Jr. et al. | |
| 2013/0138595 | A1* | 5/2013 | Brooks | G06N 5/02 706/46 |
| 2014/0040008 | A1* | 2/2014 | Belani | G06Q 30/02 705/14.41 |
| 2014/0078991 | A1* | 3/2014 | Trotter | H04M 15/43 370/328 |
| 2014/0089816 | A1* | 3/2014 | DiPersia | G06Q 50/01 715/753 |
| 2014/0180799 | A1* | 6/2014 | Keeler | G06Q 30/0246 705/14.45 |
| 2015/0100412 | A1* | 4/2015 | Sterns | G06Q 30/0242 705/14.41 |
| 2015/0127418 | A1* | 5/2015 | Piepgrass | G06Q 50/01 705/7.29 |
| 2015/0206000 | A1* | 7/2015 | El Kaliouby | G06F 3/005 382/118 |
| 2015/0304011 | A1* | 10/2015 | Ponnuswamy | H04B 7/0617 370/329 |
| 2016/0165284 | A1* | 6/2016 | Bargagni | H04N 21/4312 725/12 |
| 2016/0189198 | A1* | 6/2016 | McKenzie | G06Q 30/0277 705/14.41 |
| 2017/0193561 | A1 | 7/2017 | Shen et al. | |
| 2017/0351385 | A1* | 12/2017 | Ertmann | G06Q 10/107 |
| 2018/0124477 | A1* | 5/2018 | Qu | H04N 21/8547 |
| 2018/0300042 | A1* | 10/2018 | Clediere | G06Q 50/01 |
| 2019/0208035 | A1* | 7/2019 | Shribman | H04L 63/029 |
| 2019/0258382 | A1* | 8/2019 | Clediere | G06F 3/04817 |
| 2019/0333020 | A1* | 10/2019 | Zhao | G06Q 10/107 |
| 2020/0120097 | A1* | 4/2020 | Amitay | G06F 3/0488 |
| 2022/0036407 | A1* | 2/2022 | Narasimhan | G06Q 30/0277 |
| 2022/0046391 | A1* | 2/2022 | Ong | H04W 4/08 |
| 2022/0277356 | A1* | 9/2022 | Russo | G06Q 50/01 |
| 2022/0327579 | A1* | 10/2022 | Mitchel | G06Q 30/0273 |
| 2023/0024951 | A1* | 1/2023 | Tuscano | G06Q 20/3678 |
| 2023/0098735 | A1* | 3/2023 | Loghmani | G06Q 30/0243 705/14.42 |
| 2023/0113334 | A1* | 4/2023 | Amitay | H04L 51/52 726/2 |

OTHER PUBLICATIONS

Dokyun Lee et al. "Advertising Content and Consumer Engagement on Social Media: Evidence from Facebook." (Jun. 5, 2017). Retrieved online Oct. 19, 2023. https://papers.ssrn.com/sol3/papers.cfm?abstract_id=2290802 (Year: 2017).*

Jooyoung Kim et al. "TV advertising engagement as a state of immersion and presence." (Mar. 17, 2017). Retrieved online Oct. 19, 2023. https://www.sciencedirect.com/science/article/abs/pii/S0148296317300887 (Year: 2017).*

International Patent Application No. PCT/SG2022/050673; Int'l Search Report; dated May 5, 2023; 4 pages.

* cited by examiner

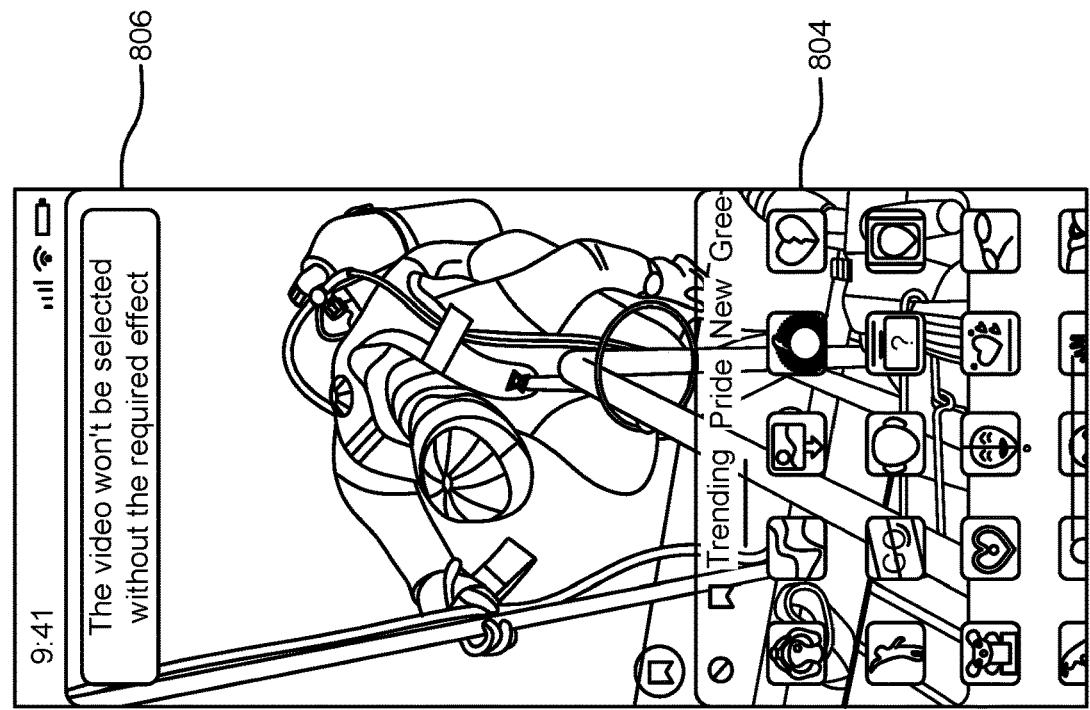
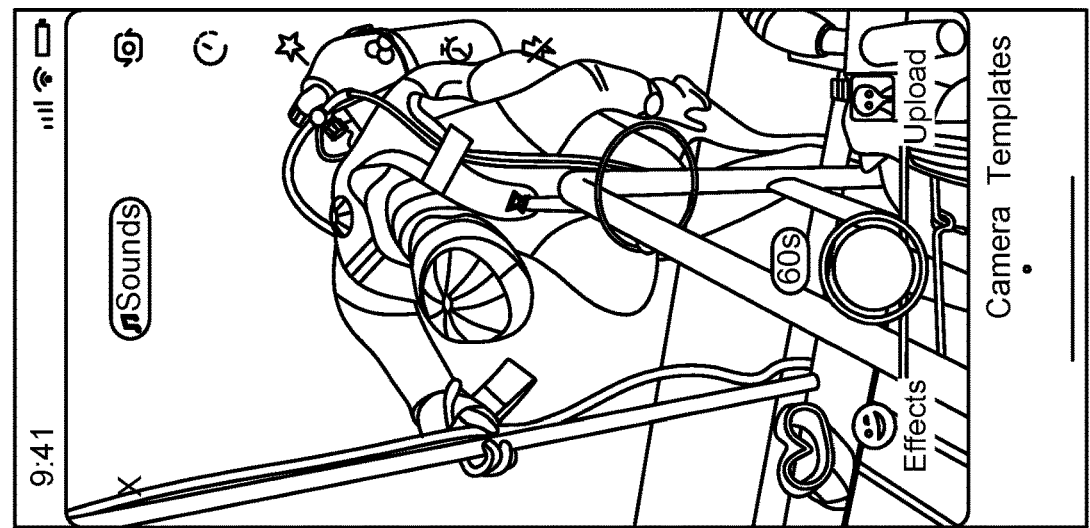
FIG. 8

1000 ↘

Mission Video Requirement —1002

Asset to Use

Hashtag —1006

| optional, e.g. #Shein |

Music ID —1008

| optional, e.g. 134425 "HAPPY" |

Branded Effect ID —1010

| optional, e.g. 34356 "HAPPY" |   ☐

1004
Create time: before the campaign starts.

1012
Must trigger the BE Effect

Account Participants Must Mention (@) —1014

| optional, e.g. 34356 "Shein_official" |

Brand related Requirement

Image —1016
Show the product in the video for more than 1 second

Product Name | optional, e.g. Coke Cola

Product Picture 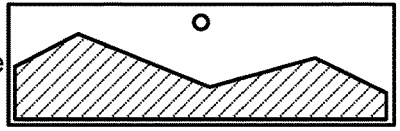

Show the brand logo in the video for more than 1 second

Brand Name | optional, e.g. Pepsi

Brand LOGO
1018 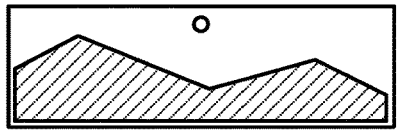

1020

Creative Guidance ⃝ Platform will display this guidance to creators, but can't select the videos according to this guidance. We encourage you to leave creators more space to create

| optional, e.g. Drink a coke with friends! |

Optimization Objective — 1022

○ Awareness

○ Consideration   1024

Number of Video to be boosted[?]

○ 50

○ 100    1028

○ 200

○ NO Limit    When the advertiser chooses "NO Limit", we will pop up a box

1026

Help balloon: Specify the maximum number of videos to boost. TikTok may take up to 3 days after the start of mission to find the most relevant videos to boost.

Warning: Using too many videos will adversely impact the system's ability to optimize the performance. Are you
| YES sure | NO |

1030

Observation Time[?]    1032

○ 24 H

○ 48 H

Help balloon: Specify the minimum time to wait and observe videos. After this period selected videos will be boosted automatically. You can control the selections in the "Management Section" <name TBD>

1036   1034 — ☐ Accept the "terms"   ○ Accept it and then it's allowed to submit 1. Advertiser solely responsible for Mission, including creating objective criteria/ rules/disclosures of its Mission in compliance with all applicable laws, regulations, and TT Community Guidelines
  1.1 Advertiser agrees all submitted videos will include ad disclosure (per FTC) [Note: TT will automatically apply to Mission videos]
  1.2 Mission Invitation will include disclaimer that Mission is not endorsed/ sponsored by TT
2. TT will publish the Advertiser's parameters/rule to Creators, but will have no obligation to monitor or revise terms
  2.1 Reservation of rights to remove Mission if there is violation of Community Guidelines
3. TT disclaims responsibility for video submission or content
  3.1 Reservation of rights to remove videos if there is violation of Community Guidelines.

1038 — [ Submit ]

FIG. 10 (Continued)

COLLABORATIVE ADVERTISING MECHANISM

BACKGROUND

Advertising is a means of communication with users of a product or service. Television, radio, newspaper, and other traditional media tools have been playing an important role in advertising products and services. In recent years, advertising based on Internet is becoming more and more popular due to the rapid development of Internet. However, conventional Internet-based advertising tools, such as emails, may not fulfil needs of users due to various limitations. Therefore, improvements in Internet-based advertising are needed.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 8 illustrates an example user interface that may be presented to the first type of users in accordance with the present disclosure.

FIG. 10 illustrates an example user interface that may be presented to the second type of users in accordance with the present disclosure.

DETAILED DESCRIPTION OF ILLUSTRATIVE EMBODIMENTS

Figure 1:
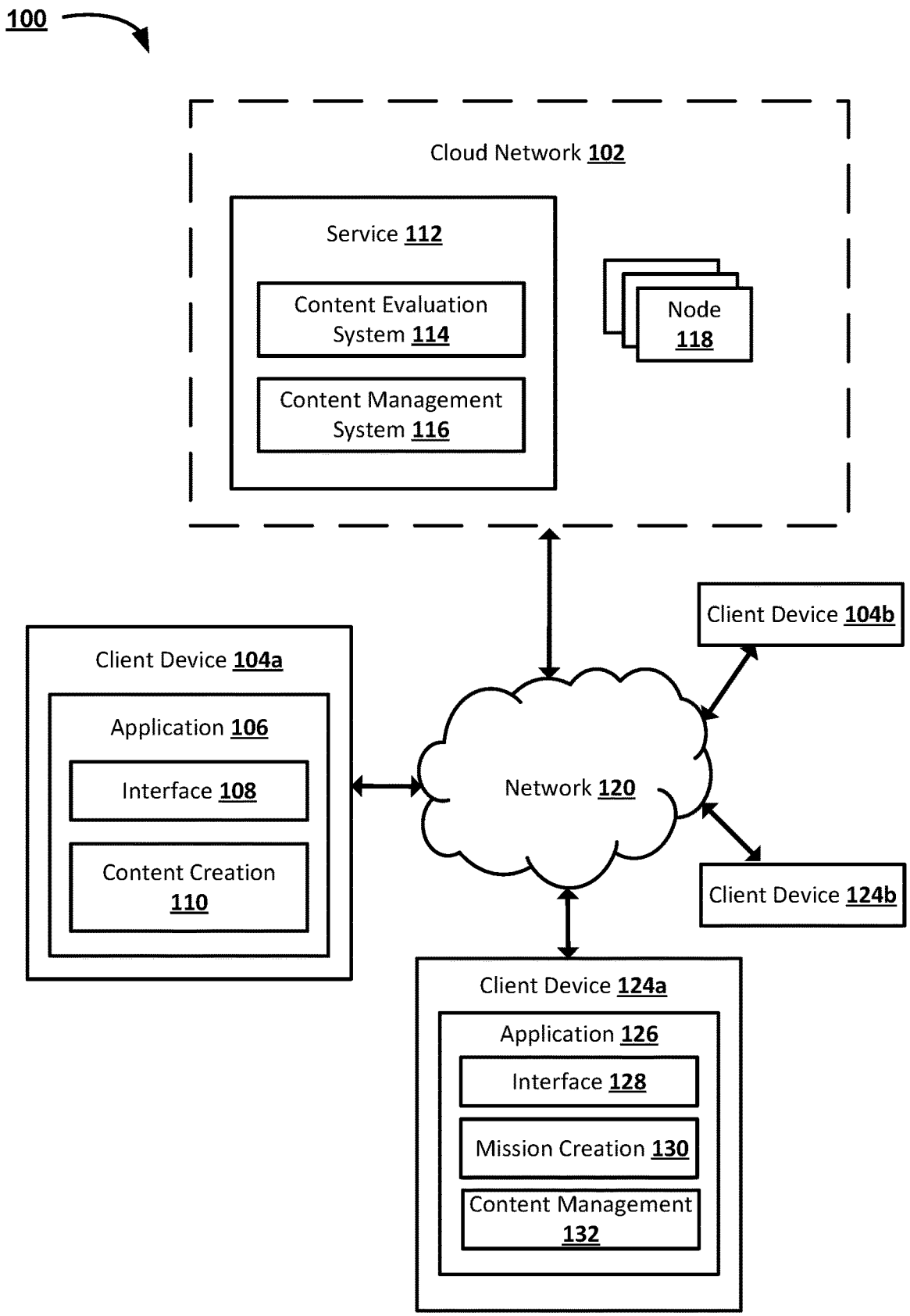
FIG. 1 illustrates an example system including a cloud service in accordance with the present disclosure.

Advertising can increase sales by telling potential and current customers about new product launches, special offers and improvements. Advertising can also help to create or develop a distinctive brand for a product or service. Generally, advertisers have four choices to create an advertisement, i.e., professional advertisement, social media influencer advertisement, organic to advertisement, and contests and creator competitions.

Professional advertisement is one of the most common advertisements. It is usually created by professional agencies or in-house creative teams. The agencies and in-house creative teams develop a concept and prepare an advertisement with their professional skills. However, professional advertisement suffers from lack of authenticity and unpredictable performance. Users are getting more and more sensitive to professional advertisement. Users want to make a purchase decision by themselves without being influenced by professional advertisement. Professional advertisement is an advertiser-to-user message and lacks authenticity of a user-to-user endorsement. Furthermore, professional advertisement is not a guarantee for good advertising performance although professional advertisement is usually expensive. For example, some professional advertisements for Superbowl end up performing poorly.

Social media influencer advertisement is another type of common advertisements. The advertiser cooperates with social medial influencers to create media posts on various platforms, e.g., Instagram, YouTube, TikTok. These posts are essentially sponsored and highly crafted messages where the influencer endorses a given product or service from the advertiser. However, sponsored posts by social media influencers have reduced authenticity and unpredictable performance. Although a social media post by an influencer may appear as user-to-user messaging, the growth of social media influencer industry has blurred the lines between professional advertisement and social media influencer advertisement. As a result, users are increasingly regarding these posts with more suspicious. Besides that, similar to the professional advertisement, social medial influencer advertisement has no guarantee of performance.

Organic to advertisement is a popular Internet-based advertisement. Occasionally, advertisers may discover creators who have voluntarily created media posts that endorse the advertiser's product and service. In this situation, the advertiser may retroactively partner with the creators to promote the given media post. The advertiser can pay the creators when the post can be shown to more users in the form of an advertisement. However, the organic to advertisement has unmanaged timing and scarcity. Creators create content based on their own impulses, and without considering an advertiser's advertising campaigns. As a result, even if a creator's post may have positive brand value, its value may be greatly diminished because the advertisers are unable to coordinate the organic messages with the rest of their advertising campaigns in terms of timing as well as who views the organic content. Additionally, the volume of endorsement messages created with no incentive is low, and often the views they generate are not high. The advertisers need to spend much effort on finding the scarce posts with high views, and then to partner with the creators of the given posts. Unfortunately, the effort is not worth the returns.

Contests and creator competitions is also a choice for advertisers. Some advertisers encourage creators to create content that promotes their product and service, and in return the creators may get some free gifts. Some platforms even facilitate this by offering creators who participate in an advertiser contest the chance to increase impressions for their content. To do this, the platforms show content from creators who participate in the contests to more other users. However, the method of contests and creator competitions lacks targetability. It also has noisy and inconsistent relevance. Content created as part of these contests are distributed without any targeting, i.e., the advertiser cannot control who sees the video. Moreover, in some contests any creator who creates content for a given contest will have a chance to receive boosted impressions. As a result, many creators may create content of marginal value or relevance for the advertisers.

The present disclosure provides a system that allows advertisers to collaborate with creators in social media community to create more effective advertisements. The system encourages creators to create content (e.g., videos) which support an advertiser's product and service. In some embodiments, content creators may create videos based on requirements set forth by an advertiser, such as comprising product name, product picture, brand name and/or brand logo in the videos, showing the product and/or brand logo in the videos for more than 1 second, and so on. Then, the created videos may be uploaded to a server for evaluation. The uploaded videos may be evaluated based on the advertiser's requirements and viewer reactions. The requirements may be customized by the advertiser based on their needs. The viewer reactions may include numbers of views, likes, shares, comments, etc. Among a plurality of videos created by creators, a plurality of top videos may be selected based on evaluation results and user input. The plurality of top videos may be selected based on target viewers, frequency control (i.e., how often should a viewer see an advertisement), bid, budgets, etc. The selected top videos conform to the requirements of the advertiser and have the best potential for engaging viewers. The selected top videos may be used as advertisements of the advertiser's ad campaign.

The techniques described in the present disclosure have unexpected technical effects. First, the techniques allow creators of any on-line community (e.g., social media) to generate authentic content for a certain mission (e.g., an advertising campaign). The techniques enable creators to create content for supporting certain products and services. Second, the techniques enable advertisers to identify content (e.g., videos) that are proven to engage viewers well. The techniques can also enable to avoid wasting resources in creating content with unsatisfactory performance. Third, the techniques can improve relevance between content (e.g., videos) and an advertiser's requirements. The techniques can ensure that the videos created by the creators are aligned with the advertiser's campaign goals and the videos can be released at the right time as the advertiser requires. Fourth, the techniques allow to improve targeting by distributing and showing the created content to the right viewers at the right time.

FIG. 1 shows example components of a cloud computing system 100. By way of example and without limitation, cloud computing system 100 may be used to perform aspects of the disclosed subject matter. Cloud-based computing generally refers to networked computer architectures where application execution, service provision, and data storage may be divided, to some extent, between clients and cloud computing devices. The "cloud" may refer to a service or a group of services accessible over a network, e.g., the Internet, by clients, server devices, and by other cloud computing systems, for example.

In one example, multiple computing devices connected to the cloud may access and use a common pool of computing power, services, applications, storage, and files. Thus, cloud computing enables a shared pool of configurable computing resources, e.g., networks, servers, storage, applications, and services, that may be provisioned and released with minimal management effort or interaction by the cloud service provider.

As an example, a cloud-based application may store copies of data and/or executable program code in the cloud computing system, while allowing client devices to download at least some of this data and program code as needed for execution at the client devices. In some examples, downloaded data and program code may be tailored to the capabilities of specific client devices, e.g., a personal computer, tablet computer, mobile phone, and/or smartphone, accessing the cloud-based application. Additionally, dividing application execution and storage between client devices and the cloud computing system allows more processing to be performed by the cloud computing system, thereby taking advantage of the cloud computing system's processing power and capability, for example.

Cloud-based computing can also refer to distributed computing architectures where data and program code for cloud-based applications are shared between one or more client devices and/or cloud computing devices on a near real-time basis. Portions of this data and program code may be dynamically delivered, as needed or otherwise, to various clients accessing the cloud-based application. Details of the cloud-based computing architecture may be largely transparent to users of client devices. By way of example and without limitation, a PC user device accessing a cloud-based application may not be aware that the PC downloads program logic and/or data from the cloud computing system, or that the PC offloads processing or storage functions to the cloud computing system, for example.

In FIG. 1, cloud computing system 100 may comprise a cloud network 102 and a plurality of client devices 104a, 104b, 124a and 124b. The client devices 104a and 104b are associated with a first type of users, such as content creators. The client devices 124a and 124b are associated with a second type of users, such as advertisers. The cloud network 102 and the plurality of client devices 104a, 104b, 124a and 124b may communicate with each other via one or more networks 120.

The cloud network 102 may be located at a data center, such as a single premise, or be distributed throughout different geographic locations (e.g., at several premises). The cloud network 102 may provide the services via the one or more networks 120. The network 120 may comprise one or more public networks (e.g., the Internet) and/or one or more private networks. A private network may include a wireless local area network (WLAN), a local area network (LAN), a wide area network (WAN), a cellular network, or an intranet. The network 120 may comprise wired network(s) and/or wireless network(s). For example, the network 120 may comprise physical links, such as coaxial cable links, twisted pair cable links, fiber optic links, a combination thereof, and/or the like. As another example, the network 120 may comprise wireless links, such as cellular links, satellite links, Wi-Fi links and/or the like. The network 120 may comprise a variety of network devices, such as routers, switches, multiplexers, hubs, modems, bridges, repeaters, firewalls, proxy devices, and/or the like.

The cloud network 102 may comprise a plurality of computing nodes 118 that host a variety of services. The plurality of computing nodes 118 may be implemented as one or more computing devices, one or more processors, one or more virtual computing instances, a combination thereof, and/or the like. The plurality of computing nodes 118 may be implemented by one or more computing devices. The one or more computing devices may comprise virtualized computing instances. The virtualized computing instances may comprise a virtual machine, such as an emulation of a computer system, operating system, server, and/or the like.

A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

In an embodiment, the nodes 118 host at least one mission service 112. The nodes 118 may process tasks associated with the mission service 112. The mission service 112 may comprise at least one content evaluation system 114 and at least one content management system 116. The content evaluation system 114 may be configured to evaluate content, such as video, audio, textual data, a combination thereof, and/or the like. The content may comprise content streams (e.g., video stream, audio stream, information stream), content files (e.g., video file, audio file, text file), and/or other data. The content may be evaluated based on one or more predetermined rules of the mission event and other data, for example, information indicative of viewer reactions to the content. The content management system 116 may be configured to manage the content. For instance, the content management system 116 may store the content, any associations with the content, and/or content metadata in one or more databases. The content management system 116 may also categorize the content. the content management system 116 may be configured to update and distribute selected content to target audience.

The plurality of client devices 104 and 124 may comprise any type of computing device, such as a mobile device, a tablet device, laptop, a desktop computer, a smart television, or other smart device (e.g., smart watch, smart speaker, smart glasses, smart helmet), a gaming device, a set top box, digital streaming device, robot, and/or the like. The client devices 104 may be associated with a first type of users, such as content creators. The client devices 124 may be associated with a second type of users, such as advertisers. A single user may use one or more of the pluralities of client devices 104 and 124 to access the cloud network 102. The plurality of client devices 104 and 124 may travel to a variety of locations and use different networks to access the cloud network 102.

The first type of users and the second type of users may be registered as users of the mission service 112. The first type of users may use a first type of application 106 operating on the client devices 104. The first type of application (i.e., creator application) 106 enables content creators to participate in mission events. The second type of users may use a second type of application 126 operating on the client devices 124. The second type of application (i.e., advertiser application) 126 enables the second type of users to create mission events and manage content. The mission service 112 may be configured to process data received from the client devices 104 and the client devices 124. The mission service 112 may also be configured to generate and distribute data to the client devices 104 and the client devices 124.

In an embodiment, content may be created by a first type of users associated with a plurality of client devices 104 and uploaded to the mission service 112 via the network 120. The content may be streamed to the mission service 112. The content stream may be a stream of videos created by a first type of users. The plurality of client devices 104 may be configured to upload the content to the mission service 112. In one example, the client device 104a may comprise the creator application 106. The first type of users may use the creator application 106 to participate in a mission event by creating and uploading content. The content may comprise videos, audio, comments, textual data and/or the like. To create videos, the first type of user may give the creator application 106 permission to access an image capture device (e.g., a camera) and/or a microphone of the client device 104.

In one embodiment, the client devices 104 may comprise content creation component 110. The content creation module 110 may be utilized, at least in part, to perform video creating, video editing, video rendering, and so on before the video is uploaded to the mission service 112. Additionally, or alternatively, the content creation module 110 may be utilized, at least in part, to perform video creating, video editing, video rendering, and so on after creation and/or uploading of the video to the mission service 112.

In another embodiment, a mission event may be created by a second type of users associated with client devices 124 and uploaded to the mission service 112 via the network 120. The mission service 112 may be configured to receive input from a second type of users associated with client devices 124. The second type of users may be registered as users of the mission service 112 and may be users of the advertiser application 126 operating on client devices 124. The data input by the second type of users may include information such as mission events, mission requirements, number of selected videos, and so on In one embodiment, the mission event may comprise specific requirements. For example, the requirements may require content to mention the brand or product, use a special song, etc. A plurality of client devices 124 may be configured to send the information associated with the mission event to the mission service 112. In one embodiment, the client device 124a may comprise the advertiser application 126. The second type of users may use the advertiser application 126 to create, edit, display, present and upload the mission event. The mission event may be an advertisement campaign and/or the like.

In one embodiment, the client devices 124 (e.g., 124a and 124b) comprise at least one mission creation component 130 and at least one content management component 132. The mission creation component 130 may be utilized, at least in part, to perform mission creating, mission editing, and so on before the mission is uploaded to the mission service 112. Additionally, or alternatively, the mission creation component 130 may be utilized, at least in part, to perform mission creating, mission editing, and so on after creation and/or uploading of the mission to the mission service 112. The content management component 132 may be configured to manage content such as videos created by the first type of users. For instance, the content management component 132 may be utilized to present content (e.g., videos). The content management component 132 may also be utilized to remove or add content at any time based on input received by a plurality of client devices 124 associated with the second type of users.

It should be appreciated that FIG. 1 is merely illustrative and that other implementations might be utilized. For instance, the client devices 104 and 124, the mission service 112, or other computing devices may be used singly or in combination to implement techniques of advertising as described in the present disclosure. It should also be appreciated that network topology illustrated in FIG. 1 has been greatly simplified and that many more networks, devices, and databases may be utilized to interconnect various computing systems.

Figure 2:
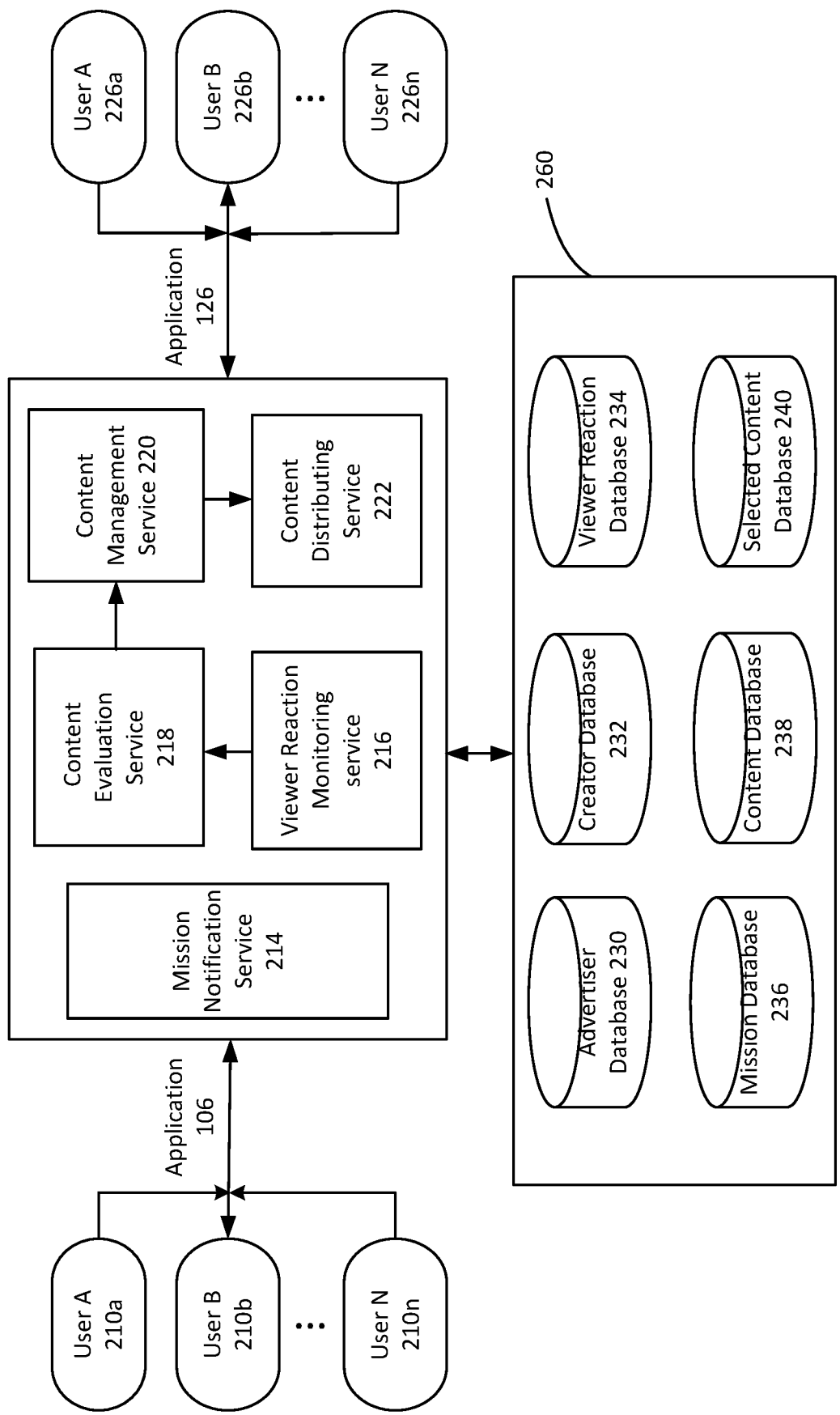
FIG. 2 illustrates an example system which may be used in accordance with the present disclosure.

FIG. 2 shows an example collaborative mission service 202 for carrying out the disclosed techniques. By way of example and without limitation, the collaborative mission service 202 may run on the cloud network 102 in FIG. 1. The collaborative mission service 202 may include a combination of cloud network devices and local devices. The collaborative mission service 202 may include a mission notification service 214, a viewer reaction monitoring service 216, a content evaluation service 218, a content management service 220, and a content distributing service 222.

The collaborative mission service 202 may communicate with at least two types of users: a first type of users 210 (i.e., 210a, 210b, . . . 210n) and a second type of users 226 (i.e., 226a, 226b, . . . 226n). The first type of users 210 may be associated with client devices 104 (i.e., 104a, 104b) in FIG. 1. In one example, the first type of users 210 may be creators that create content (e.g., videos) based on the requirements of a certain mission (e.g., advertising campaign). The first type of users 210 may be registered as users of the collaborative mission service 202 The first type of users 210 may use the creator application 106 operating on client devices (e.g., the client devices 104 shown in FIG. 1). The second type of users 226 may be associated with client devices 124 (i.e., 124a, 124b) in FIG. 1. In one example, the second type of users 226 may be advertisers that create a mission event (e.g., an advertising campaign). The second type of users 226 may be registered as users of the collaborative mission service 202. The second type of users 226 may use the advertiser application 126 operating on client devices (e.g., the client devices124 shown in FIG. 1).

The collaborative mission service 202 may be configured to comprise mission notification service 214. Once the second type of user 226 requests to start a mission event, the mission notification service 214 may generate information and notify the first type of users 210 of the mission event. In one example, the mission notification service 214 may notify the first type of user 210 by sending messages or emails to a plurality of client devices (e.g., the client devices 104) associated with the first type of users 210. The first type of users 210 may also be notified via the user interface of the creator application 106 operating on the client devices 104.

The viewer reaction monitoring service 216 may be configured to monitor viewer reactions to content (e.g., videos) uploaded by the first type of users 210 and capture data associated with the viewer reactions to the content. In one embodiment, the viewer reaction monitoring service 216 may monitor how well each piece of content engages viewers. The viewer reaction monitoring service 222 may capture data indicative of viewer reactions, such as numbers of views, likes, shares, content of comments, or other information indicating viewers' reactions to the content.

The content evaluation service 218 may be configured to evaluate content uploaded by client devices (e.g., the client devices 104 shown in FIG. 1) associated with the first type of users 210. The content evaluation service 218 may evaluate content, such as video, audio, textual data, a combination thereof, and/or the like. The content may comprise content streams (e.g., video stream, audio stream, information stream), content files (e.g., video file, audio file, text file), and/or other data. In some embodiments, the content may be evaluated based on one or more predetermined rules of a mission event (e.g., mission requirements) and information indicative of viewer reactions to the content. The predetermined rules of the mission event, such as mission requirements, may be utilized to determine how well the content conforms to the mission requirements. The mission requirements may be customized by the second type of users 226 (e.g., advertisers) based on their needs.

The information indicative of viewer reactions may be monitored by the viewer reaction monitoring service 216 and stored in a database, such as the viewer reaction database 234. In one embodiment, the viewer reactions to the content may be input into the content evaluation service 218. The content evaluation service 218 may sort the information indicative of viewer reactions based on rules and/or algorithms. In one example, the content evaluation service 218 may count numbers of views, likes, shares, and/or others associated with each piece of content. Different types of viewer reaction may have different weights for evaluating the content. For example, a number of shares may have a higher weight than the number of views. In another example, the content evaluation service 218 may analyze viewers' comments for evaluating the content. The content evaluation service 218 may generate data based on the information captured by the viewer reaction monitoring service 216. The information and data associated with viewer reactions may be used to evaluate content uploaded by the first type of users 210.

The content evaluation service 218 may generate data indicating evaluation results of the content (e.g., videos) received from the first type of users 210. In one example, the content evaluation service 218 may score a plurality of videos created by the first type of users 210 based on the mission requirements and information/data indicative of viewers' reactions to each video. The content evaluation services 218 may select some of the plurality of videos based on their respective scores. The content evaluation service 218 may transmit the selected videos and data associated with the selected videos to the client devices associated with the second type of users 226. The selected videos and the data associated with the selected videos may be presented to the second type of users 226 via the second type of application (e.g., the advertiser application 126). The second type of users 226 may input information via the advertiser application 126. The content evaluation service 218 may further determine at least one subset of the selected videos based on user input from the second type of users 226. The at least one subset of the selected videos may be used for a corresponding mission event (e.g., a corresponding advertising campaign). The at least one subset of the selected videos may be stored to one or more databases (e.g., the selected content database 240). The at least one subset of the selected videos may be managed by the content management service 220.

The content management service 220may be configured to manage the content created by the first type of users 210 as well as at least one subset of the content determined to be used for the corresponding advertising campaign. In one example, the content management service 220 may associate a plurality of videos with a corresponding mission event. The content management service 220 may store information indicative of the association between the plurality of videos and the corresponding mission event into at least one database (e.g., the content database 238). The content management service 220 may update the content database 238 based on user input and/or new videos uploaded by the first type of users 210. The content management service 220 may also categorize the content based on different mission events, different creators, and/or other information.

In another example, the content management service 220 may also manage at least one subset of the plurality of videos selected for a corresponding mission event. The content management service 220 may store the at least one subset of the plurality of videos into at least one database (e.g., the selected content database 240). The content management service 220 may update the at least one subset of the plurality of videos selected for a corresponding mission event. For example, the content management service 220 may remove a video from or add a new video into the selected subset of videos based on updated information indicative of viewer reactions and/or user input. a.

The content distributing service 222 may distribute content selected for a corresponding mission event. In one example, the content distributing service 222 may distribute videos selected for a corresponding advertising campaign. For example, the content distributing service 222 may distribute the selected videos to the target audience using any suitable advertisement distribution techniques.

The collaborative mission service 202 may store user information, information indicating mission events, content created by the first type of users, information indicative of viewer reactions to the content, and/or content selected for corresponding mission event in one or more databases 260. For example, the collaborative mission service 202 may include an advertiser database 230 for storing information associated with advertisers, a creator database 232 for storing information associated with creators, a viewer reaction database 234 for storing information indicative of viewers' reactions to content created by the first type of users 210, a mission database 236 for storing information associated with mission events created by the second type of users 226, the content database 238 for storing content created by the first type of users 210, and the selected content database 240 for storing content selected for corresponding mission events.

It should be appreciated that the collaborative mission service 202 in FIG. 2 is merely illustrative and other implementations might be utilized. It should also be appreciated that the functionality disclosed herein may be implemented by one or more servers or computing devices. Additionally, it should be appreciated that the functionality disclosed herein might be implemented in software, hardware or a combination of software and hardware.

Figure 3:
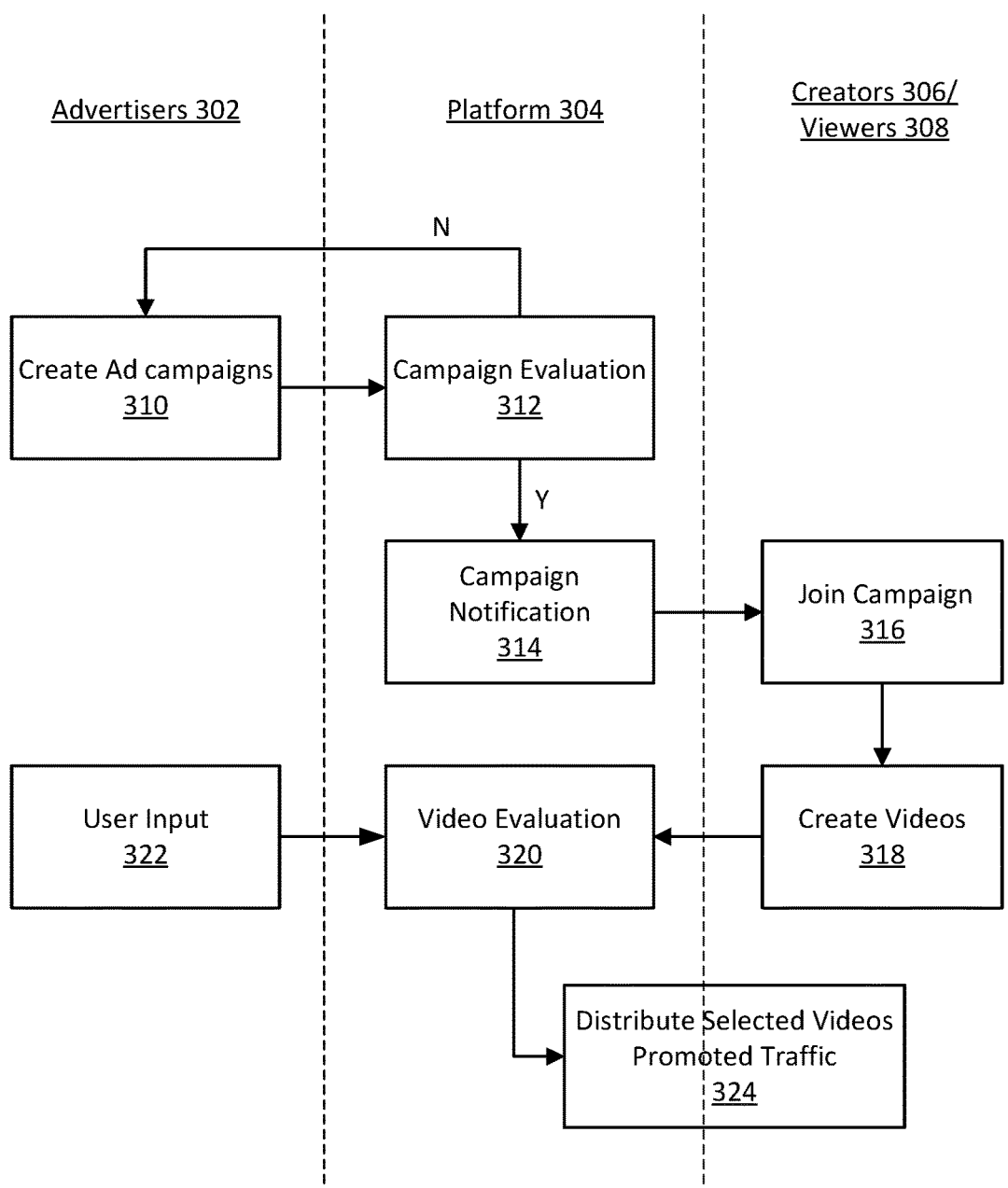
FIG. 3 illustrates an example process which may be performed by a collaborative mission service in accordance with the present disclosure.

FIG. 3 shows an example process that may be performed by a collaborative mission service (e.g., collaborative mission service 202 shown in FIG. 2) as well as applications (e.g., creator application 106 and advertiser application 126). At 310, in one embodiment, an advertiser 302 may create an advertising campaign by entering at least one input via an application (e.g., advertiser application 126). For example, as shown in FIG. 10, the advertiser 302 may create an advertising campaign by customizing "Mission Video Requirement" and then clicking on "Submit" icon via the user interface (UI) of the advertiser application 126 operating on client devices (e.g., client device 124*a*). After the advertising campaign is created, a request may be sent to the service platform 304 to implement the advertising campaign.

At 312, the platform 304 may receive the request of implementing the advertising campaign. In response, the platform 304 may evaluate the advertising campaign request based on predetermined rules (e.g., codes of conduct for social media) and based on determining whether the advertiser 302 has provided information needed for creating an advertising campaign. In one embodiment, the platform 304 may not approve the advertising campaign request, then the advertiser 302 may receive a rejection notification. The platform 304 may explain the reasons of rejection in the notification. The platform 304 may also propose suggestions to the advertiser 302 about how to address the rejection. In another embodiment, the platform 304 may approve the advertising campaign request, then information indicative of the approval of the advertising campaign may be sent to a mission notification service (e.g., the mission notification service 214) of the platform 304.

At 314, the campaign may be notified to users of the platform 304. For example, the mission notification service (e.g., mission notification service 214) may notify the content creators 306 about the campaign. The mission notification service 214 may notify the content creators 306 by sending messages or emails to a plurality of client devices associated with the content creators 306. The content creators 306 may also be notified via the user interface of an application (e.g., the creator application 106) operating on the client devices.

At 316, after receiving the notification about the campaign, the creators 306 may review mission requirements and join the advertising campaign if they are interested in the campaign. In another example, the creators 306 may ignore the campaign notification if they are not interested in the campaign.

At 318, the creators 306 may create content, such as videos, according to the mission requirements set forth by the advertisers 302. The mission requirements may include music ID, hashtag, specific augmented reality, virtual reality effect, etc. FIG. 7 shows example mission requirements. The creators 306 may use the creator application (e.g., creator application 106) to create, edit, and upload the content to the platform 304. In one example, the content may comprise videos, audio, comments, textual data and/or the like. In another example, content may comprise videos, captions, images, hashtag, etc. To create the video, the creators 306 may give the creator application 106 permission to access an image capture device, such as a camera, or a microphone of the client device 104.

At 320, the platform 304 may evaluate the content (e.g., videos) created and uploaded by the creators 306. The evaluation of the content may be performed by a content evaluation service (e.g., the content evaluation service 218 in FIG. 2) of the platform 304 based on predetermined rules associated with the campaign and information indicating reactions to the content by the viewers 308. In one example, the predetermined rules may comprise requirements of the campaign set forth by the advertisers 302. The predetermined rules may be utilized to determine how well the content conforms to the requirements of advertisers 302.

The reactions to the content by the viewers 308 are monitored by the platform 304 that capture information indicative of the viewer reactions. The information indicative of viewer reactions to the content may include numbers of views, likes, shares, content of comments on the content, and so on. The viewer reactions may be monitored by a viewer reaction monitoring service of the platform (e.g., the viewer reaction monitoring service 216) and stored in at least one database, such as the viewer reaction database 234. The viewer reactions to the content may be input into the content evaluation service 218 for evaluating the content. At least one subset of videos uploaded by the creators 306 may be selected and used for the particular campaign created by the advertiser 302.

At 324, the selected videos may be distributed by a distributing service (e.g., the content distributing service 222). The content distributing service may distribute the videos selected for a particular campaign. As described above, the videos are selected based at least in part on the reactions by the viewers 308. Only the videos having good engagements with the viewers 308 may be selected for the particular campaign. The selected videos having good engagements with the viewers may effectively promote the advertiser 302's product or service.

Figure 4:
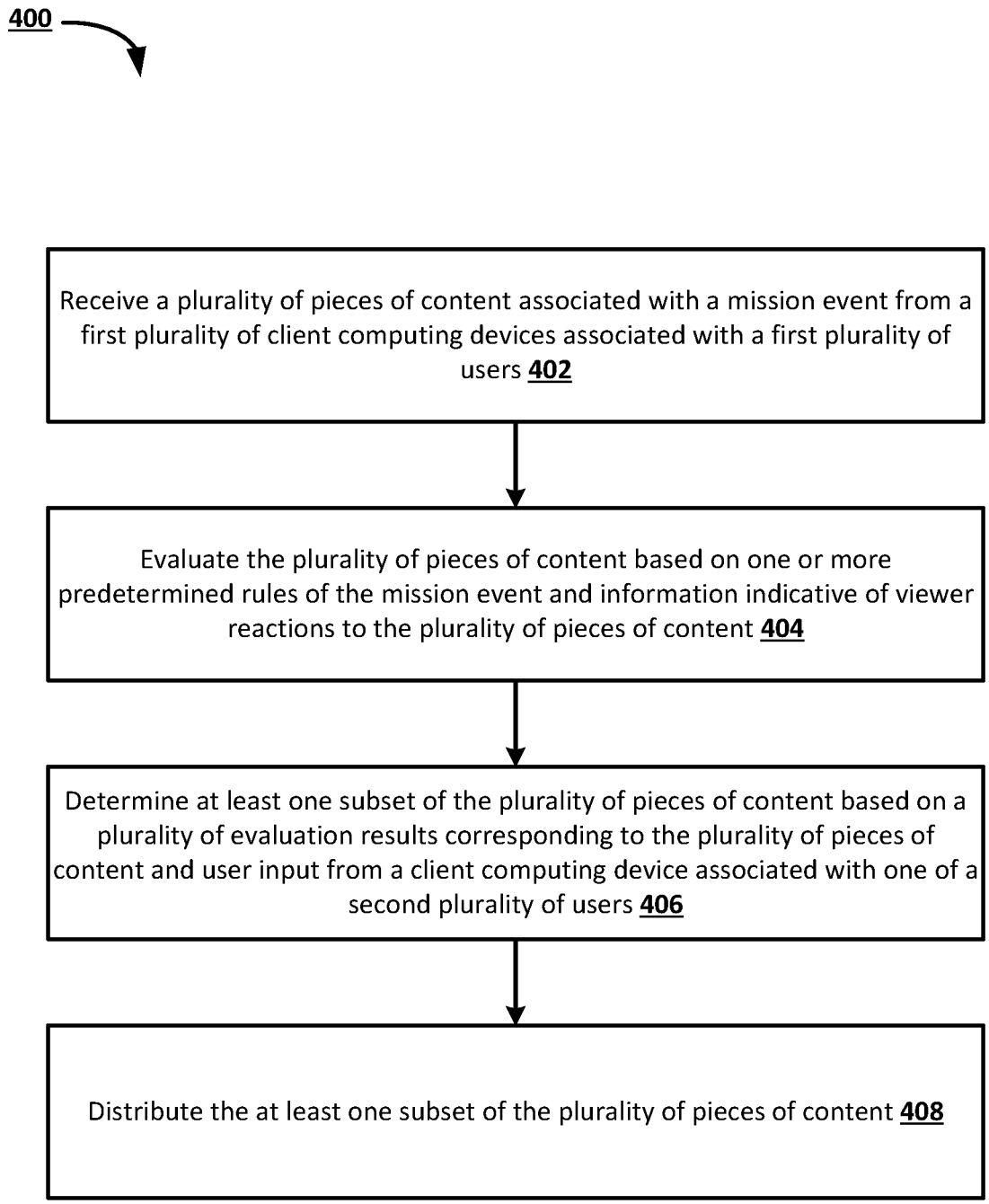
FIG. 4 illustrates an example process which may be performed by a collaborative mission service in accordance with the present disclosure.

FIG. 4 shows an example process 400 performed by the mission service (e.g., collaborative mission service 202). Although depicted as a sequence of operations in FIG. 4, those of ordinary skill in the art will appreciate that various embodiments may add, remove, reorder, or modify the depicted operations.

At 402, a plurality of pieces of content may be received from a first plurality of client computing devices associated with a first plurality of users. The first plurality of users may be a first type of users (e.g., the creators 306). The first plurality of client computing devices may be client computing devices associated with a first type of users (e.g., the client computing devices 104). The content may be associated with a mission event (e.g., an advertising campaign). The mission event may be created by a second type of users, such as the advertiser 302. The content may be received by a collaborative mission service (e.g., the collaborative service 202) and stored in at least one database, such as content database 238. The content may comprise video, audio, comments, textual data and/or the like. In one example, the plurality of pieces of content may be a plurality of videos created and uploaded by content creator (e.g., the creators 306).

A 404, the plurality of pieces of content may be evaluated based on one or more predetermined rules of the mission event and information indicative of viewer reactions to the content. The predetermined rules of the mission event may be mission requirements set forth by the second type of users (e.g., the advertisers 302). The mission requirements may be utilized to determine how well each of the plurality of pieces of content conforms to the requirements of a particular mission event. The second type of users may customize the requirements based on their needs. In one example in FIG. 10, the requirements of advertisers 302 may comprise Asset to User, Brand-related Requirement, Creative Guidance, Optimization Objective, Number of Video to be boosted, Observation Time, etc. The Asset to User may include more details, such as #Hashtag, Music ID, Branded Effect ID, Account Participants Must Mention (@). The Brand-related Requirement may further comprise Show the product in the video for more than 1 second, Product Name, Product Picture, Show the brand logo in the video for more than 1 second, Brand Name, Brand LOGO, etc. The information indicative of viewer reactions to the content may include a number of views, a number of likes, a number of shares, comments on the content, etc. In one example, the viewer reactions may be monitored by a viewer reaction monitoring service (e.g., the viewer reaction monitoring service 216) and stored in at least one database, such as the viewer reaction database 234 in FIG. 2. In one embodiment, the viewer reactions to the content may be input into a content evaluation service (e.g., the content evaluation service 218). The content evaluation service may sort the information indicative of viewer reactions based on rules and/or algorithms. In one example, the content evaluation service 218 may count a number of views, a number of likes, and a number of shares associated with each piece of content. Different types of viewer reaction may be assigned different weights. In another example, the content evaluation service 218 may analyze viewers' comments for evaluating the plurality pieces of content. The content evaluation service may generate data indicating a plurality of evaluation results corresponding to the plurality of pieces of content. In one example, the content evaluation service may score the plurality of pieces of content based on the mission requirements and information/data indicative of viewers' reactions to each piece of content. The content evaluation services may select some pieces of content based on their respective scores.

At 406, at least one subset of the plurality of pieces of content may be determined based on a plurality of evaluation results corresponding to the plurality of pieces of content and user input from a client computing device associated with one of a second plurality of users. The content evaluation service may transmit selected content, evaluation results corresponding to the selected content, and other data associated with the selected content to a client device (e.g., the client device 124) associated with one of the second plurality of users (e.g., the advertiser 302). The selected content and the data associated with the selected content may be presented to the one of the second plurality of users via a second type of application (e.g., the advertiser application 126). The one of the second plurality of users may input information based on the evaluation results and other data associated with the selected content. The content evaluation service may further determine at least one subset of the selected content based at least in part on user input from the one of the second plurality of users.

At 408, the at least one subset of the plurality of pieces of content may be distributed. The at least one subset of the plurality of pieces of content may be distributed to target audience for promoting a corresponding mission event (e.g., a corresponding advertising campaign). The at least one subset of the plurality of pieces of may be distributed by a content distributing service (e.g., the content distributing service 222).

Figure 5:
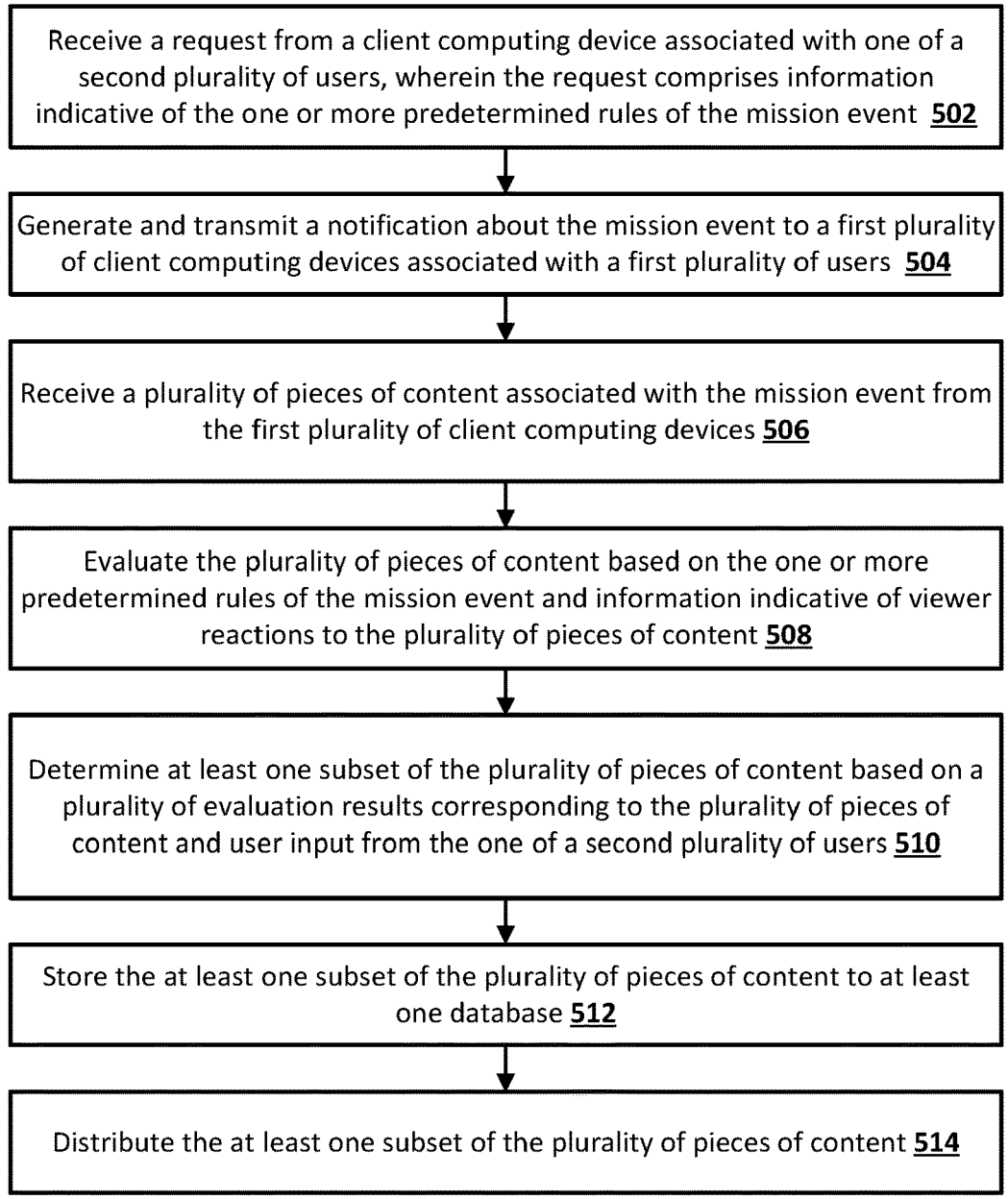
FIG. 5 illustrates another example process which may be performed by a collaborative mission service in accordance with the present disclosure.

FIG. 5 shows another example process 500 performed by the mission service (e.g., collaborative mission service 202). Although depicted as a sequence of operations in FIG. 5, those of ordinary skill in the art will appreciate that various embodiments may add, remove, reorder, or modify the depicted operations.

At 502, a request for a mission event may be received from a client computing device (e.g., the client computer 124) associated with one of the second plurality of users (e.g., the advertiser 302. The request may comprise information indicative of a plurality of predetermined rules of the mission event. In one example, the mission event may be an advertising campaign, and the predetermined rules may be mission requirement which may be customized by the advertisers 302. In one embodiment, the mission requirement may comprise Asset to User, Brand-related Requirement, Creative Guidance, Optimization Objective, Number of Video to be boosted, Observation Time, etc. The Asset to User may include more details, such as #Hashtag, Music ID, Branded Effect ID, Account Participants Must Mention (@). The Brand-related Requirement may further comprise Show the product in the video for more than 1 second, Product Name, Product Picture, Show the brand logo in the video for more than 1 second, Brand Name, Brand LOGO, etc.

At 504, a notification about the mission event may be generated and transmitted to a first plurality of client computing devices (e.g., the client devices 104) associated with a first plurality of users (e.g., the content creators 306). The notification may be generated and transmitted by a mission notification service (e.g., the mission notification service 214). In one example, the mission notification service may notify the first plurality of users by sending messages or emails to the first plurality of client computing devices (e.g., the client devices 104). In another example, the first plurality of users may also be notified via the user interface of a creator application (e.g., creator application 106) operating on the first plurality of client computing devices.

At 506, a plurality of pieces of content may be received from a first plurality of client computing devices associated with a first plurality of users. The first plurality of users may be a first type of users (e.g., the creators 306). The first plurality of client computing devices may be client computing devices (e.g., the client devices 104) associated with the first type of users. The content may be associated with a mission event (e.g., an advertising campaign). The mission event may be created by a second type of users, such as the advertisers 302 in FIG. 3. The content may be received by a collaborative mission service (e.g., the collaborative service 202) and stored in at least one database, such as content database 238. In one example, the content may be a video which is uploaded via user interface of an application (e.g., creator application 106) associated with creators 306. In an embodiment, the content may comprise video, audio, comments, textual data and/or the like. In one example, the plurality of pieces of content may be a plurality of videos created and uploaded by content creator (e.g., the creators 306).

At 508, the plurality of pieces of content may be evaluated based on one or more predetermined rules of the mission event and information indicative of viewer reactions to the content. The predetermined rules of the mission event may be mission requirements set forth by the second type of users (e.g., the advertisers 302). The mission requirements may be utilized to determine how well each of the plurality of pieces of content conforms to the requirements of a particular mission event. The information indicative of viewer reactions to the content may include a number of views, a number of likes, a number of shares, comments on the content, etc. A content evaluation service (e.g., the content evaluation service 218) may sort the information indicative of viewer reactions based on rules and/or algorithms. For example, the content evaluation service may count a number of views, a number of likes, and a number of shares associated with each piece of content and analyze viewers' comments on each piece of content. The content evaluation service may generate data indicating a plurality of evaluation results corresponding to the plurality of pieces of content. In one example, the content evaluation service may score the plurality of pieces of content based on the mission requirements and information/data indicative of viewers' reactions to each piece of content. The content evaluation service may select some pieces of content based on their respective scores. The selected pieces of content have good engagements with viewers.

At 510, at least one subset of the plurality of pieces of content may be determined based on a plurality of evaluation results corresponding to the plurality of pieces of content and user input from a client computing device associated with one of a second plurality of users. The content evaluation service may transmit selected content and data associated with the selected content to a client device (e.g., the client device 124) associated with one of the second plurality of users (e.g., the advertiser 302). The selected content and the data associated with the selected content may be presented to the one of the second plurality of users via a second type of application (e.g., the advertiser application 126). The one of the second plurality of users may input information based on the evaluation results and other data associated with the selected content. The content evaluation service may further determine at least one subset of the selected content based at least in part on user input from the one of the second plurality of users.

At 512, the at least one subset of the plurality of pieces of content may be stored to at least one database, for example, the selected content database 240. The selected content database 240 may be updated based on updated information indicating viewer reactions and input from the one of the second plurality of users. For example, a piece of content may be removed from the selected content database and a new piece of content may be added to the selected content database.

At 514, the at least one subset of the plurality of pieces of content may be distributed. The at least one subset of the plurality of pieces of content may be distributed to target audience for promoting a corresponding mission event (e.g., a corresponding advertising campaign). The at least one subset of the plurality of pieces of may be distributed by a content distributing service (e.g., the content distributing service 222).

Figure 6:
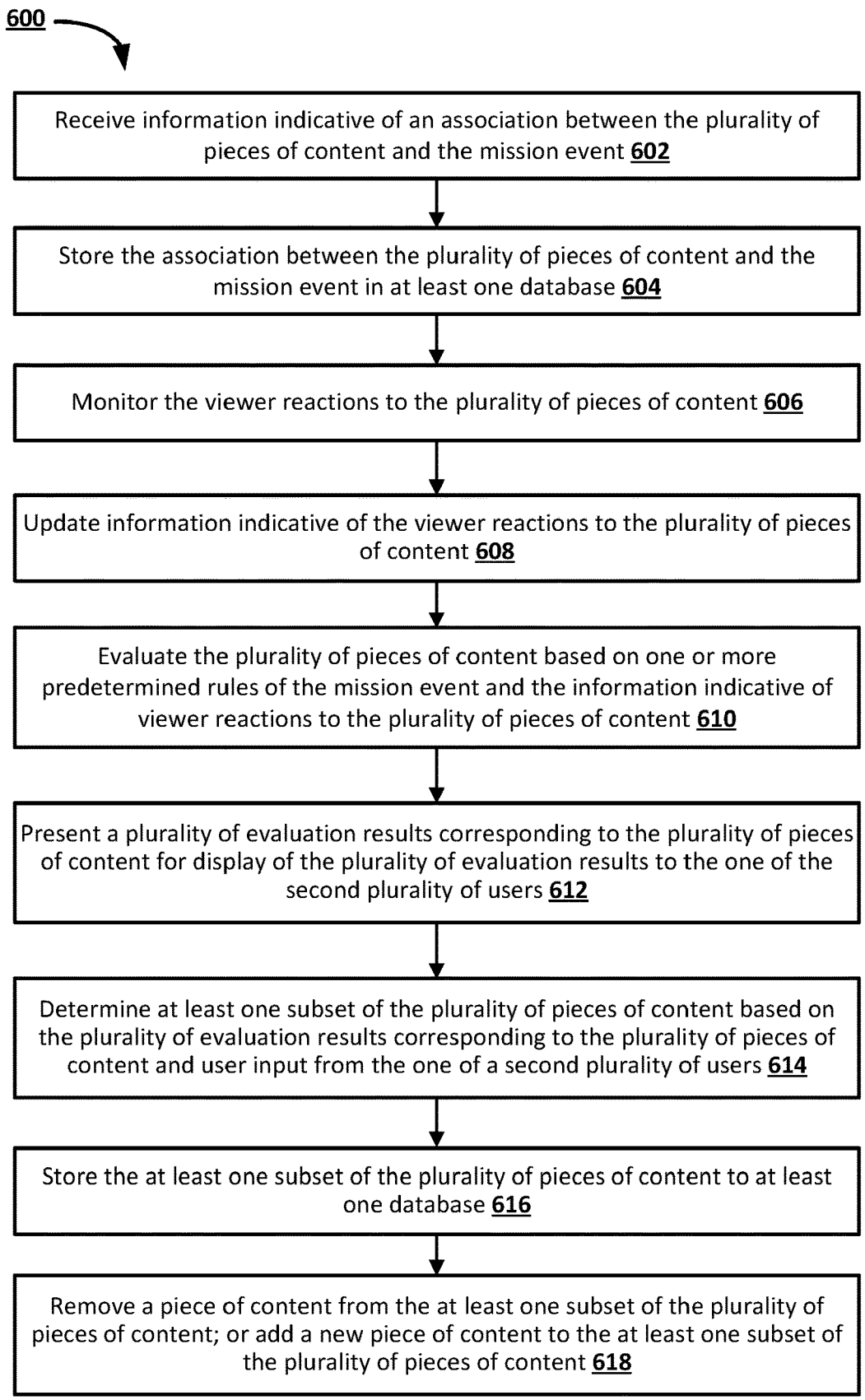
FIG. 6 further illustrates an example process which may be performed by a collaborative mission service in accordance with the present disclosure

FIG. 6 shows another example process 600 performed by a mission service (e.g., the collaborative mission service 202). Although depicted as a sequence of operations in FIG. 6, those of ordinary skill in the art will appreciate that various embodiments may add, remove, reorder, or modify the depicted operations.

At 602, information indicative of an association between a plurality of pieces of content and a mission event (e.g., advertising campaign) may be received by a mission service (e.g., the collaborative mission service 202). The mission service may associate the plurality of pieces of content with a corresponding mission event based on the received information. At 604, the association between the plurality of pieces of content and the corresponding mission event may be stored in one or more databases, e.g., the mission database 236 and the content database 238.

At 606, the viewer reaction monitoring service 216 may monitor viewer reactions to the plurality of pieces of content may be monitored. The viewer reactions may be monitored by a viewer reaction monitoring service (e.g., the viewer reaction monitoring service 216). The viewer reaction monitoring service may monitor viewer reactions to each piece of content. The viewer reaction monitoring service may capture information indicating how well each piece of content engages viewers in real time. The information indicative of viewer reactions may comprise a number of views, a number of likes, a number of shares associated with each piece of content, and comments on each piece of content. The viewer reaction monitoring service may store the captured information into at least one database (e.g., the viewer reaction database 234). At 608, the information indicative of viewer reactions stored in the at least one database may be updated based on viewer reaction information captured in real time by the viewer reaction monitoring service.

At 610, the plurality of pieces of content may be evaluated based on one or more predetermined rules of the mission event and information indicative of viewer reactions to the content. The predetermined rules of the mission event may be mission requirements set forth by the second type of users (e.g., the advertisers 302). The mission requirements may be utilized to determine how well each of the plurality of pieces of content conforms to the requirements of a particular mission event. The information indicative of viewer reactions to the content may include a number of views, a number of likes, a number of shares, comments on the content, etc. A content evaluation service (e.g., the content evaluation service 218) may sort the information indicative of viewer reactions based on rules and/or algorithms. The content evaluation service may generate data indicating a plurality of evaluation results corresponding to the plurality of pieces of content. In one example, the content evaluation service may score the plurality of pieces of content based on the mission requirements and information/data indicative of viewers' reactions to each piece of content.

At 612, a plurality of evaluation results corresponding to the plurality of pieces of content may be provided for display the plurality of evaluation results to one of the second plurality of users (e.g., the advertiser 302). The content evaluation service may transmit a plurality of evaluation results corresponding to the plurality of pieces of content and other data associated with the plurality of pieces of content to a client device (e.g., the client device 124) associated with one of the second plurality of users (e.g., the advertiser 302). The plurality of evaluation results and the other data associated with the pieces of content may be displayed to the one of the second plurality of users via a second type of application (e.g., the advertiser application 126).

At 614, at least one subset of the plurality of pieces of content may be determined based on the plurality of evaluation results and user input from the one of the second plurality of users. The one of the second plurality of users may input information based on the plurality of evaluation results via user interfaces of the second type of application (e.g., the advertiser application 126). The content evaluation service may determine at least one subset of the selected content based on the evaluation results and user input from the one of the second plurality of users.

At 616, the at least one subset of the plurality of pieces of content may be stored to at least one database, for example, the selected content database 240. The at least one subset of the plurality of pieces of content may be updated based on updated information indicating viewer reactions and input from the one of the second plurality of users. At 618, a piece of content may be removed from at least one subset of the plurality of pieces of content and a new piece of content may be added to the at least one subset of the plurality of pieces of content.

Figure 7A:
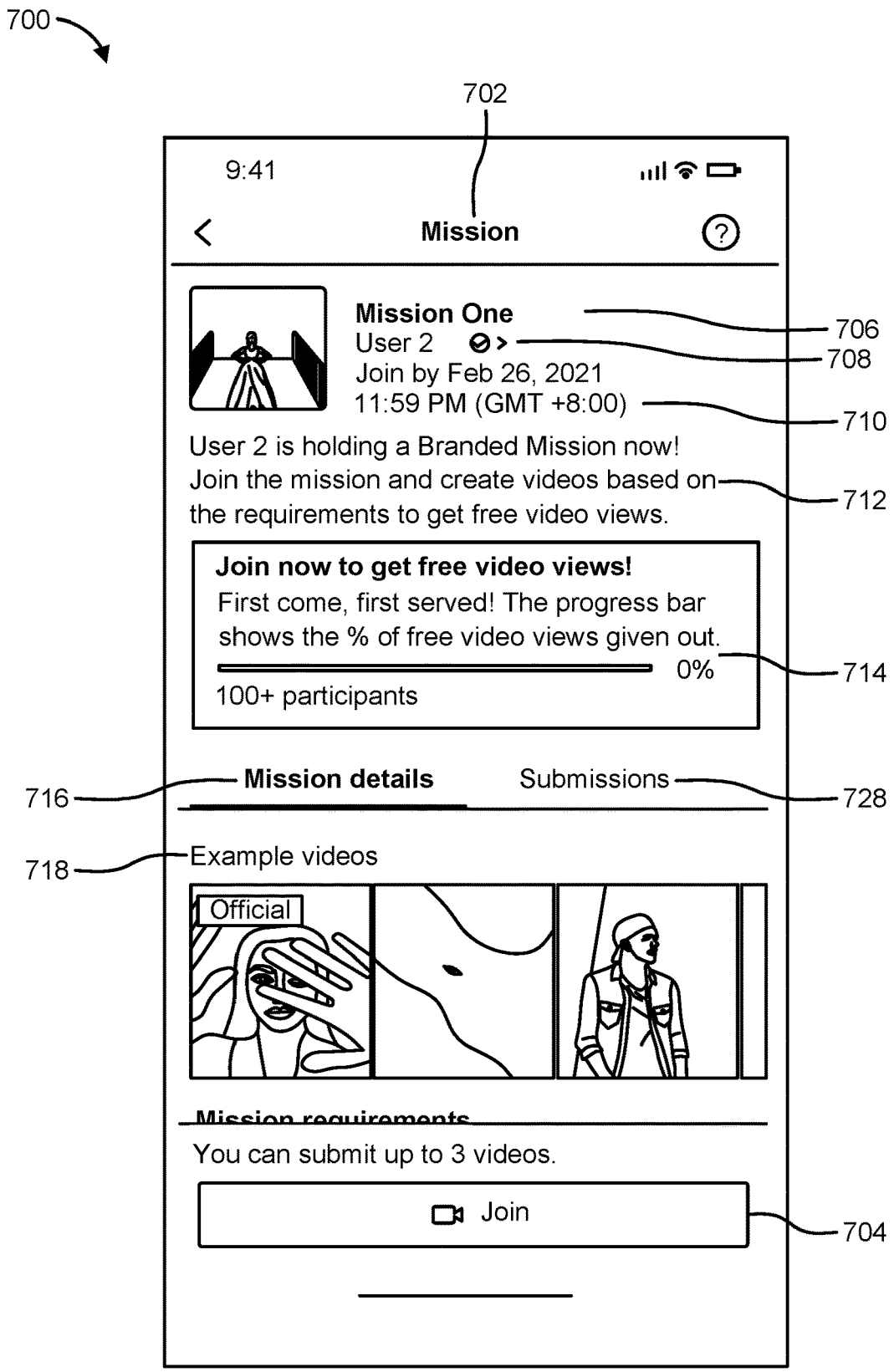
FIG. 7A and FIG. 7B illustrate an example user interface that may be presented to the first type of users in accordance with the present disclosure.
Figure 7B:
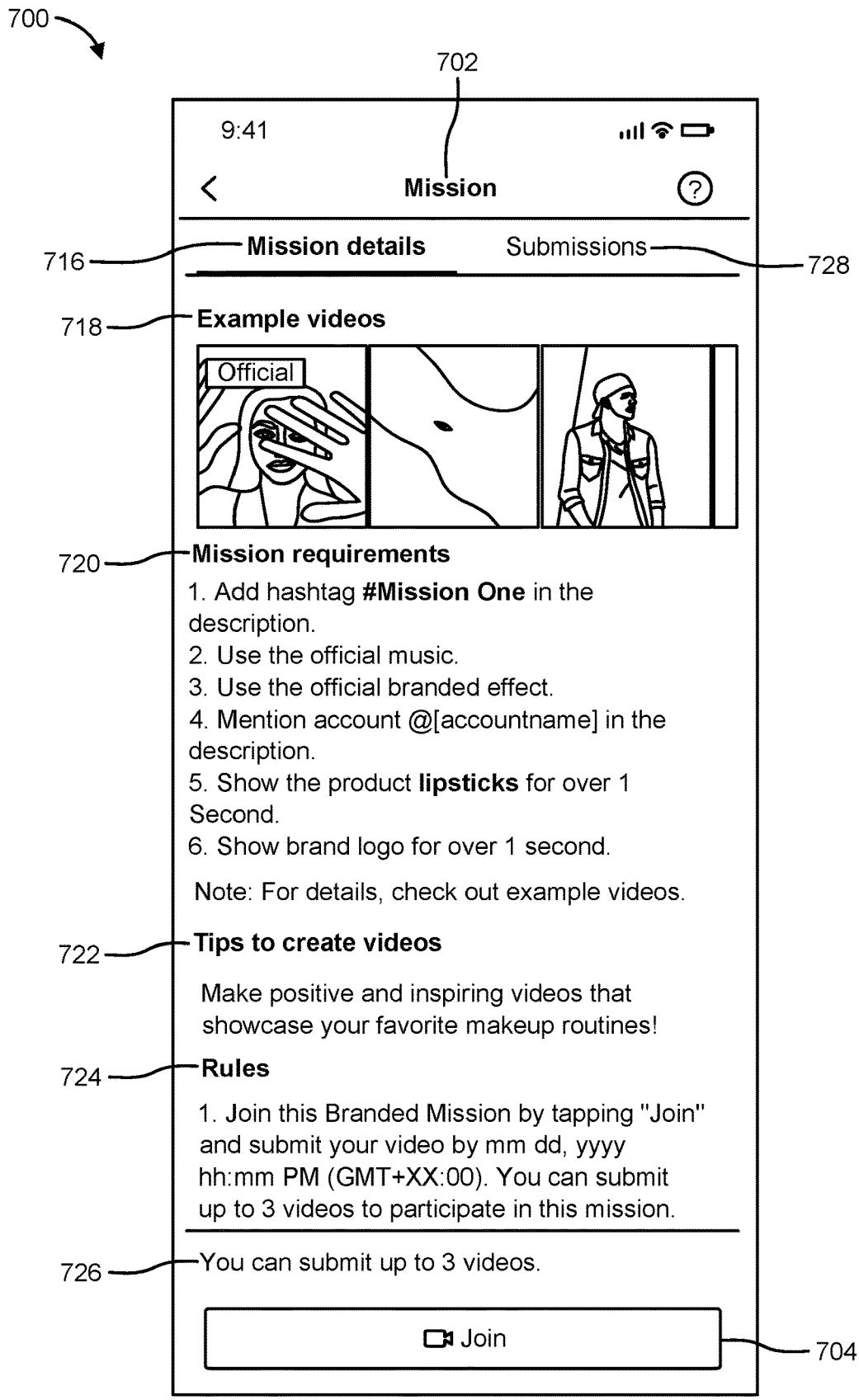

FIGS. 7A and 7B illustrate example user interface (UI) 700 of the first type of application (e.g., the creator application 104). The first type of users may view the UI 700 of the creator application operating on a client device (e.g., client devices 104a, 104b). The client device may be associated with the first type of users (e.g., creators 306). It should be appreciated that the UI 700 in FIGS. 7A and 7B is merely illustrative and other display arrangements might be utilized.

In one embodiment, a mission 702 may be created by a second type of users (e.g., the advertiser 302). The first type of users may view the mission 702 via the UI of an application (e.g., creator application 106). After viewing the mission 702, the first type of user may join the mission by clicking on the "Join" button 704 if interested in the mission 702.

As shown in FIG. 7A, the mission 702 may comprise mission topic 706, mission creator's name 708, deadline of joining the mission 710, brief introduction to the mission 712, rule and benefits 714, mission details 716, example videos 718, submissions 720, etc. In an example, the mission topic 706 may be "Mission One." The mission creator's name 708 may be User 2. The deadline of joining the mission 710 may be Feb. 26, 2021 11:59 PM (GMT +8:00). The brief introduction to the mission 712 may comprise "Sephora is holding a Branded Mission now! Join the mission and create video based on the requirements to get free video views." The rule and benefits 714 may include "Join now to get free video views! First come, first served! The progress bar shows the % of free video views given out." The progress bar may show the percentage of participants that have joined the mission 702.

As shown in FIG. 7B, the mission details 716 may further include Example videos 718, Mission requirements 720, Tips to create videos 722, Rules 724. A note 726 may also be included on the user interface. In an example, example videos 718 may be provided by the second type of users (e.g., the advertisers 302). The example videos 718 may provide the first type of user with ideas of how to create a video according to the mission requirements 720.

The second type of users may set customized mission requirements 720 based on their needs. The customized mission requirements 720 may include mentioning the brand or product, highlighting a feature of the product, using a specific song, using special platform features (e.g., augmented reality, virtual reality effects), specific scenario to follow in creating the video and other creative guidelines. In one example, the Mission requirements 720 may include "1. Add hashtag #mission one in the description. 2. Use the official music. 3. Use the official branded effect. 4. Mention account @[accountname] in the description. 5. Show the product YSL lipsticks for over 1 second. 6. Show Sephora's brand logo for over 1 second." The first type of users may need to follow the mission requirements in the progress of creating content (e.g., videos).

The Tips to create videos 722 may be "Make positive and inspiring videos that showcase your favorite makeup routines!" The Rules 724 may include "1. Join this Branded Mission by tapping "Join" and submit your video by mm dd, yyyy hh:mm PM (GMT+XX:00). You can submit up to 3 videos to participate in this mission. 2. Any video submitted for this mission must comply with TikTok's {Terms of Service}, {Community Guidelines}, and your local laws. 3. If your video meets the mission requirements, your video will have a chance to get increased traffic depending on the engagement data (likes, shares, comments). 4. Once you submit your video, do not delete the video, set it to private or friends only, or set it to "Only show in ads." Otherwise, your video won't get free views. 5. Once your video starts getting free video views, a sponsorship hashtag will be added to your video description. 6. In addition, the Rules 724 may include Disclaimer from the platform 304 (e.g., TikTok). The note 726 may be "You can submit up to 3 videos." to provide reminders to the first type of users.

After viewing the mission 702, the first type of user may decide whether to join the mission 702 or not. If the first type of user is interested in the mission 702 and submits videos via the user interface, the first type of user may check the submission result under the tab Submissions 728. The Submissions 728 may show status of submitted content (e.g., videos).

FIG. 8 illustrates another example user interface (UI) 800 of the first type of application (e.g., the creator application 104). The first type of user may view the UI 800 of the creator application 106 operating on client devices associated with the first type of users (e.g., the creators 306). It should be appreciated that the UI 800 in FIG. 8 is merely illustrative and other display arrangements might be utilized.

In one embodiment, at 802, the first type of user may start to create a video using the given music and preset effect. The given music and preset effect may be predetermined by the second type of user (e.g., advertisers 302). In the process of creating the video, at 804, the first type of user may receive one or more reminders 806 from the platform 304. For example, the platform 304 may notify the first type of user that the video will not be selected without the required effect or the required music. The first type of user may also receive other reminders 806 if the video is not following the mission requirements set by the second type of users.

In another embodiment, the first type of user may select a desired music and effect, rather than the given music and preset effect. The UI may be similar to the example UI 800 and will not be illustrated herewith.

Figure 9:
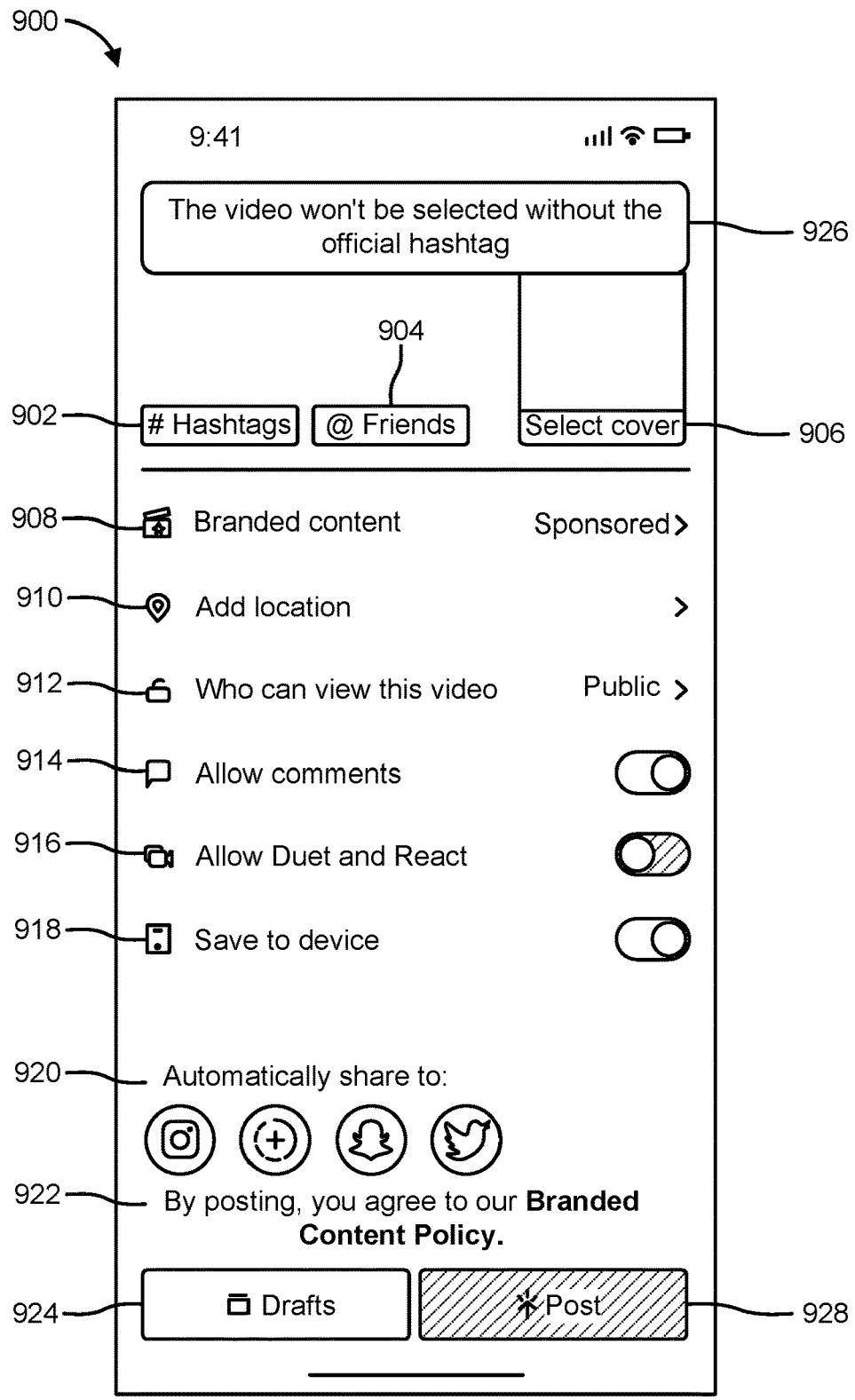
FIG. 9 further illustrates an example user interface that may be presented to the first type of users in accordance with the present disclosure.

FIG. 9 illustrates another example user interface 900 of the first type of application (e.g., the creator application 104). The first type of user may view the UI 900 of an application (e.g., creator application 106) operating on a client device (e.g., client devices 104*a*, 104*b*). The client device may be associated with the first type of users (e.g., creators 306). It should be appreciated that the UI 900 in FIG. 9 is merely illustrative and other display arrangements might be utilized.

In one embodiment, the first type of user may choose #Hashtags 902 to identify the video on the specific topic preset by the second type of users (e.g., advertisers 306). The #Hashtags 902 may help categorize the video. The first type of user may choose @Friends 904 to share the video with friends. @Friends 904 may help the video to receive more views from friends. The video may have a Select cover 906 chosen by the first type of user. An attractive select cover 906 may gain more views for the video. The Branded content 908 may be included for the video to show the video is sponsored or not. The first type of user may use Add location 910 to add location information to the video. The location information may show where the video is created. Also, the first type of user may make a choice of Who can view this video 912. The video may be set as public, private, or only to friend. The first type of user may permit comments to the video by selecting Allow comments 914. The first type of user may have full control over whether other users can perform duets with, or react to, the video by the option of Allow Duet and React 916. The video may also be saved to the local device by choosing Save to device 918. The video may be shared to social media (e.g., Instagram, Twitter, Snapchat) by choosing the icons under Automatically share to 920. The application (e.g., creator application 106) may also notify the first type of user that "By posting, you agree to our Branded Content Policy" 922.

The first type of user may save the video as a draft and then retrieve the draft video by clicking on the "Drafts" button 924. The first type of user may also receive a plurality of reminders 926 from the application (e.g., creator application 106) while editing the video. For example, the application may notify the first type of user that "The video won't be selected without the official hashtag or without mentioning the official account", "Uploading a video directly will remove the required effect, and the video won't be selected", "LIVE will remove the required effect, and the video won't be selected", "Using a template will remove the required effect, and the video won't be selected", "Applying status will remove the required effect, and the video won't be selected". The first type of user may update the draft video in response to the reminders 926 from the application. The first type of user may edit the draft video again and again until the video is satisfactory. Once the video is completed, the first type of user may upload the video to the platform 304 by clicking the "Post" button 928.

FIG. 10 illustrates an example user interface (UI) 1000 of a second type of application (e.g., the advertisers 124) for creating a mission event (e.g., an advertising campaign). The second type of users may view the UI 1000 of the advertiser application 124 operating on client devices (e.g., client devices 124*a*, 124*b*). The client devices may be associated with the second type of user (e.g., the advertisers 302). It should be appreciated that the UI 1000 in FIG. 10 is merely illustrative and other display arrangements might be utilized.

In one embodiment, a help balloon 1004 may be next to the Mission Video Requirement 1002. The help balloon 1004 may remind the second type of user that the create time of mission may be before the campaign starts. The Mission Video Requirement 1002 may comprise Asset to Use, Brand-related Requirement, etc.

The Asset to Use may include more details, such as #Hashtag 1006, Music ID 1008, Branded Effect ID 1010, Account Participants Must Mention (@) 1012, etc. #Hashtag 1006 may be optional. For example, the second type of user (e.g., advertisers 302) may input #Shein as a hashtag. Music ID 1008 may be optional. In one example, the second type of user may choose a special music for the mission event. In another example, the second type of user may choose any music that is related to the mission event. Branded Effect ID 1010 may be optional. The Branded Effect ID 1010 may be specialized by the second type of user according to their needs. A checkbox 1012 may also be optional to determine whether to must trigger the BE Effect. Account Participants Must Mention (@) 1012 may be optional. For example, "Skein_official" may be input if the second type of user wants to mention Shein official in the video.

The Brand-related Requirement may comprise a plurality of requirements for the image 1016. The image 1016 may be required to show the product in the video for more than 1 second and show the brand logo in the video for more than 1 second. Both product name and brand name are optional. For example, Coke may be input as a product name, and Pepsi may be input as a brand name. The second type of user may also upload product picture and brand logo that need to be shown in the image 1016.

Creative Guidance 1018 may be optional. For example, the second type of user may input "Drink a coke with friends!" as a creative guidance 1018. There may be a help balloon 1020 after creative guidance 1018. For example, the help balloon 1020 may remind that "Platform will display this guidance to creators, but can't select the videos according to this guidance. We encourage you to leave creators more space to create authentic videos."

Under Optimization Objective 1022, the second type of user may choose awareness or consideration to optimize objective. In one example, if the second type of user wants viewers to generate interest in the product or service, the option of awareness may be chosen. In another example, if the second type of user wants the viewers to start thinking about the product or service and look for more information, the option of consideration may be chosen.

The second type of user may choose a number of videos to be boosted at 1024. There may be a help balloon 1026 after the number of videos to be boosted. The help balloon 1026 may show "Help balloon: Specify the maximum number of videos to boost. A social media platform may take up to 3 days after the start of mission to find the most relevant videos to boost." The number of videos to be boosted may be chosen from 50, 100, 200, or NO Limit. If NO Limit is chosen, a help balloon 1028 may show that "When the advertiser chooses "NO Limit", we will pop up a box". For example, the box may be a warning box showing "Warning: Using too many videos will adversely impact the system's ability to optimize the performance. Are you sure?" The second type of user may need to determine whether to choose the option of NO Limit.

The second type of user may choose the observation time 1030. For example, the observation time may be 24 H or 48

H. There may be a help balloon 1032 after the observation time 1030. The help balloon 1032 may remind that "Help balloon: Specify the minimum time to wait and observe videos. After this period selected videos will be boosted automatically. You can control the selections in the Management Section."

The second type of user may check the box "Accept the terms" 1034 and the disclaimer 1036 from the platform such as TikTok. Thereafter, the second type of users may submit the request of creating a mission event by clicking the Submit button 1038.

Figure 11:
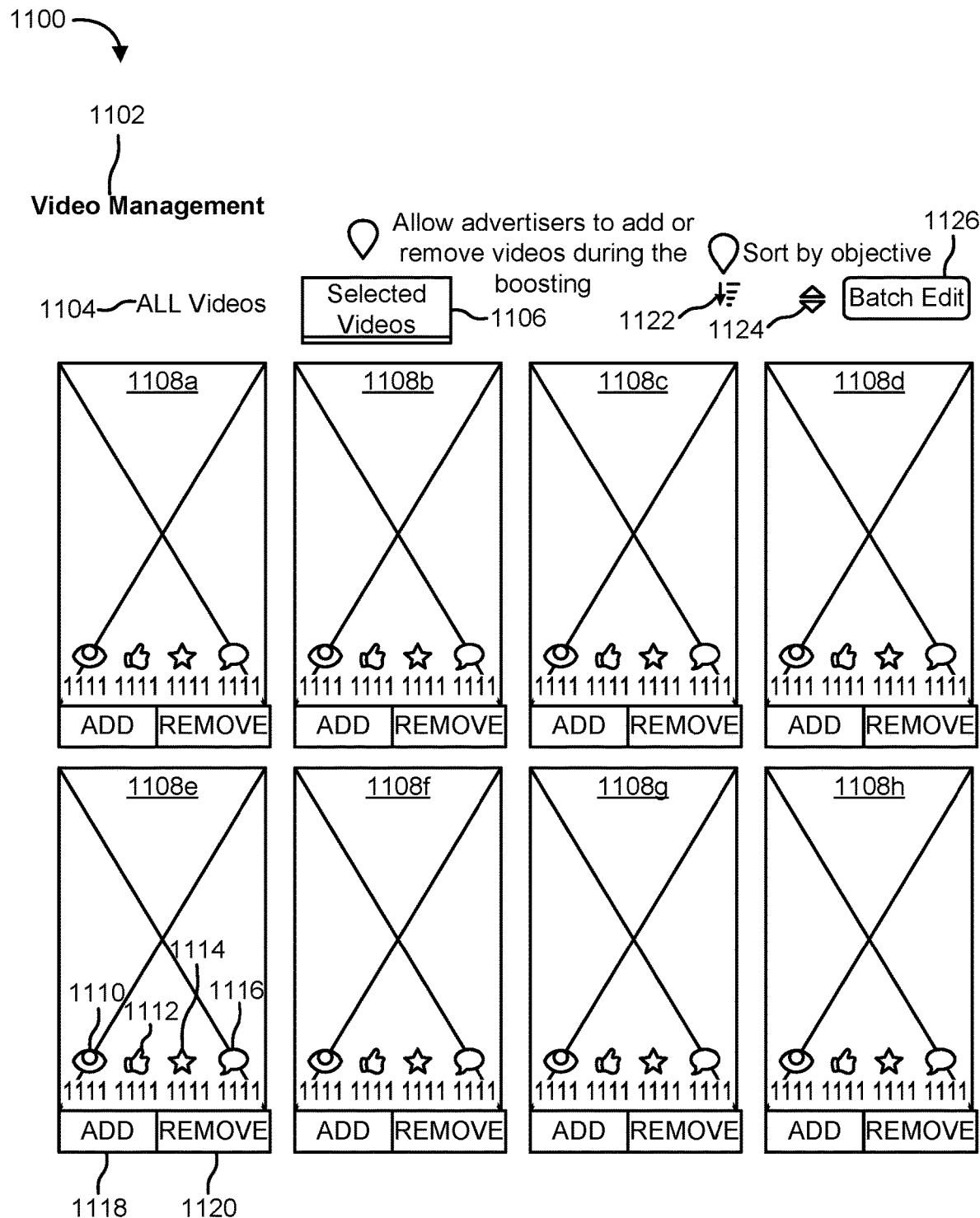
FIG. 11 illustrates another example user interface that may be presented to the second type of users in accordance with the present disclosure.

FIG. 11 illustrates an example user interface (UI) 1100 for the second type of user (e.g., the advertisers 302) to manage content (e.g., videos). The second type of users may view the UI 1100 of an application (e.g., the advertiser application 126) operating on client devices (e.g., the client devices 124a, 124b). The client devices may be associated with the second type of users (e.g., advertisers 302). It should be appreciated that the UI 1100 in FIG. 11 is merely illustrative and other display arrangements might be utilized.

In one embodiment, there may be two categories (i.e., ALL Videos 1104 and Selected Videos 1106) under video management 1102. As shown in FIG. 11, a plurality of videos (1108a-1108h) may be shown in the category of selected videos 1106. Similarly, there may be a plurality of videos shown in the category of all videos 1104. The second type of user (e.g., advertisers 302) may determine the number of videos. For example, the number may be 3, 8, 15, etc. Each of the videos may have viewer reactions to the content. The viewer reactions may comprise views 1110, likes 1112, shares 1114, comments 1116, and other information. Each of the videos may also have ADD button 1118 and REMOVE button 1120. The second type of user may add or remove videos during the boosting using the ADD button 1118 and REMOVE button 1120. In another example, the second type of user may sort the videos by objective using the sorting icon 1122. In one embodiment, the second type of user may sort the videos based on the number of views 1110. In another embodiment, the second type of user may sort the videos based on the number of shares 1114. The second type of user may go to previous page or next page to view more videos by using the page icons 1124. The second type of user may edit a plurality of videos at the same time by using Batch Edit button 1126. For example, if three videos are related to Pepsi coke, the logo of Pepsi may be added to the three videos using one edit.

Figure 12:
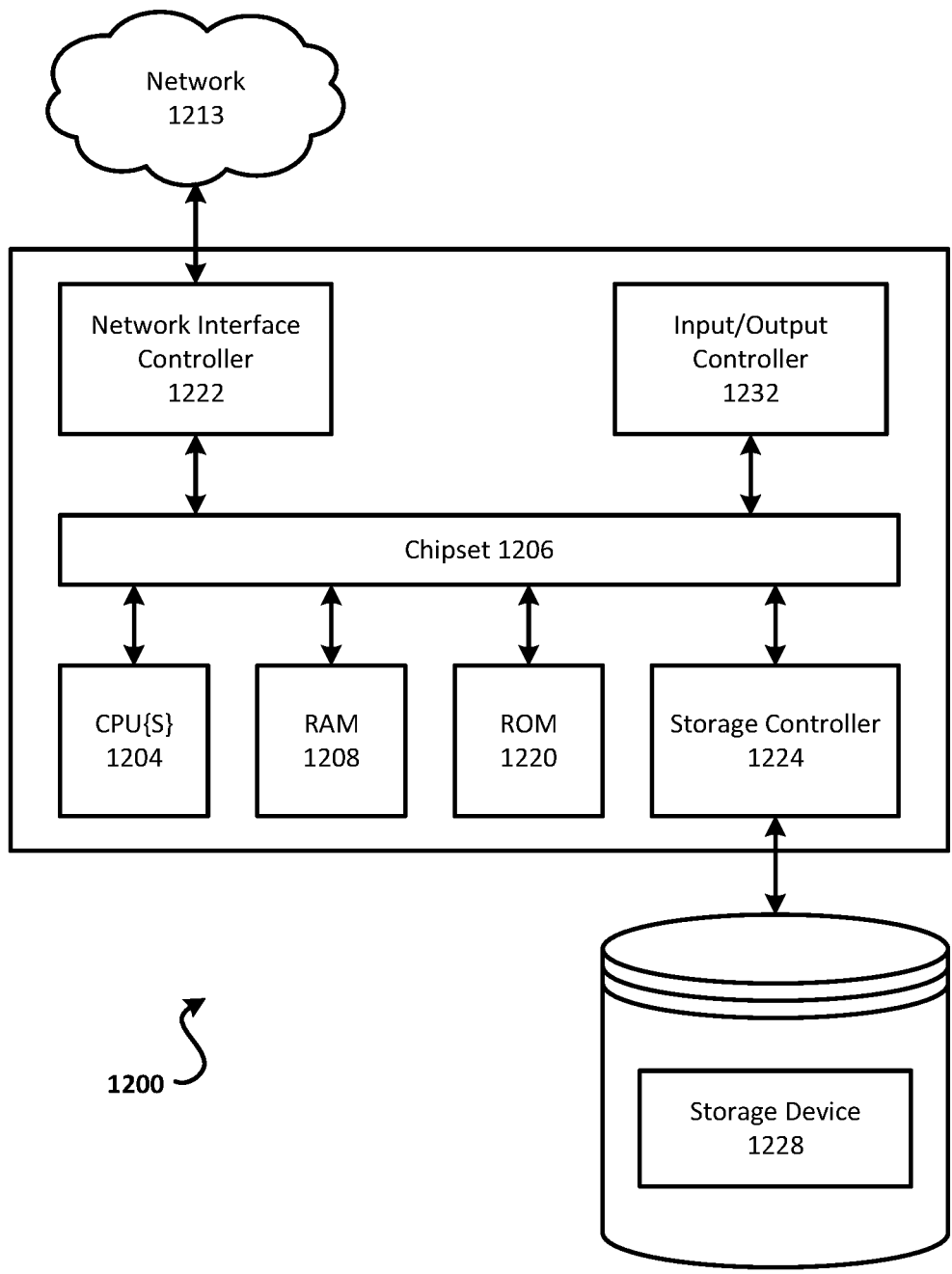
FIG. 12 illustrates an example computing device that may be used in accordance with the present disclosure.

FIG. 12 depicts a computing device that may be used in various aspects. With regard to the example environment of FIG. 1, one or more of mission services 112, client device 104, or client device 124 may be implemented in an instance of a computing device 1200 of FIG. 12. The computer architecture shown in FIG. 12 shows a conventional server computer, workstation, desktop computer, laptop, tablet, network appliance, PDA, e-reader, digital cellular phone, or other computing node, and may be utilized to execute any aspects of the computers described herein, such as to implement the methods described in the present disclosure.

The computing device 1200 may include a baseboard, or "motherboard," which is a printed circuit board to which a multitude of components or devices may be connected by way of a system bus or other electrical communication paths. One or more central processing units (CPUs) 1204 may operate in conjunction with a chipset 1206. The CPU(s) 1204 may be standard programmable processors that perform arithmetic and logical operations necessary for the operation of the computing device 1200.

The CPU(s) 1204 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1204 may be augmented with or replaced by other processing units, such as GPU(s). The GPU(s) may comprise processing units specialized for but not necessarily limited to highly parallel computations, such as graphics and other visualization-related processing.

A user interface may be provided between the CPU(s) 1204 and the remainder of the components and devices on the baseboard. The interface may be used to access a random access memory (RAM) 1208 used as the main memory in the computing device 1200. The interface may be used to access a computer-readable storage medium, such as a read-only memory (ROM) 1220 or non-volatile RAM (NVRAM) (not shown), for storing basic routines that may help to start up the computing device 1200 and to transfer information between the various components and devices. ROM 1220 or NVRAM may also store other software components necessary for the operation of the computing device 1200 in accordance with the aspects described herein. The user interface may be provided by a one or more electrical components such as the chipset 1206.

The computing device 1200 may operate in a networked environment using logical connections to remote computing nodes and computer systems through local area network (LAN). The chipset 1206 may include functionality for providing network connectivity through a network interface controller (NIC) 1222, such as a gigabit Ethernet adapter. A NIC 1222 may be capable of connecting the computing device 1200 to other computing nodes over a network 1213. It should be appreciated that multiple NICs 1222 may be present in the computing device 1200, connecting the computing device to other types of networks and remote computer systems.

The computing device 1200 may be connected to a storage device 1228 that provides non-volatile storage for the computer. The storage device 1228 may store system programs, application programs, other program modules, and data, which have been described in greater detail herein. The storage device 1228 may be connected to the computing device 1200 through a storage controller 1224 connected to the chipset 1206. The storage device 1228 may consist of one or more physical storage units. A storage controller 1224 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1200 may store data on a storage device 1228 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 1228 is characterized as primary or secondary storage and the like.

For example, the computing device 1200 may store information to the storage device 1228 by issuing instructions through a storage controller 1224 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1200 may read information from the storage device 1228 by detecting the physical states or characteristics of one or more particular locations within the physical storage units.

In addition to the storage device 1228 described herein, the computing device 1200 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1200.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 1228 depicted in FIG. 12, may store an operating system utilized to control the operation of the computing device 1200. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 1228 may store other system or application programs and data utilized by the computing device 1200.

The storage device 1228 or other computer-readable storage media may also be encoded with computer-executable instructions, which, when loaded into the computing device 400, transforms the computing device from a general-purpose computing system into a special-purpose computer capable of implementing the aspects described herein. These computer-executable instructions transform the computing device 1200 by specifying how the CPU(s) 1204 transition between states, as described herein. The computing device 1200 may have access to computer-readable storage media storing computer-executable instructions, which, when executed by the computing device 1200, may perform the methods described in the present disclosure.

A computing device, such as the computing device 1200 depicted in FIG. 12, may also include an input/output controller 1232 for receiving and processing input from a number of input devices, such as a keyboard, a mouse, a touchpad, a touch screen, an electronic stylus, or other type of input device. Similarly, an input/output controller 1232 may provide output to a display, such as a computer monitor, a flat-panel display, a digital projector, a printer, a plotter, or other type of output device. It will be appreciated that the computing device 1200 may not include all of the components shown in FIG. 12, may include other components that are not explicitly shown in FIG. 12, or may utilize an architecture completely different than that shown in FIG. 12.

As described herein, a computing device may be a physical computing device, such as the computing device 1200 of FIG. 12. A computing node may also include a virtual machine host process and one or more virtual machine instances. Computer-executable instructions may be executed by the physical hardware of a computing device indirectly through interpretation and/or execution of instructions stored and executed in the context of a virtual machine.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer-readable media. Any of the disclosed methods may be performed by computer-readable instructions embodied on computer-readable media. Computer-readable media may be any available media that may be accessed by a computer. By way of example and not meant to be limiting, computer-readable media may comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information, and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A computer-implemented method implemented by a server computing system for improving efficiency and effectiveness of online missions, comprising:
    generating, by a server computing system, a first notification indicative of a mission event and transmitting the first notification to a first plurality of client computing devices, wherein the first notification is generated based on receiving a request comprising one or more predetermined rules of the mission event, wherein the one or more predetermined rules comprise a requirement to display a predetermined item in content to be created;
    generating, by the server computing system, a second notification and transmitting the second notification to at least one of a subset of the first plurality of client computing devices during a process of creating a piece of content, wherein the subset of the first plurality of client computing devices have initiated content creation in response to receiving the first notification, and wherein the second notification indicates that the piece of content in the process of being created fails to comply with the one or more predetermined rules;
    receiving, by the server computing system, a plurality of pieces of content associated with the mission event from some of the first plurality of client computing devices;
    monitoring and capturing in real time information indicative of viewer reactions to each of the plurality of pieces of content by the server computing system;
    sorting the information indicative of the viewer reactions using an algorithm by the server computing system;
    evaluating, by the server computing system, the plurality of pieces of content based on the one or more predetermined rules of the mission event and the information indicative of the viewer reactions to each of the plurality of pieces of content;
    generating, by the server computing system, data indicating a plurality of evaluation results corresponding to the plurality of pieces of content;
    transmitting, by the server computing system, the plurality of evaluation results corresponding to the plurality of pieces of content for display on a client computing device that sent the request;
    determining at least one subset of the plurality of pieces of content based on the plurality of evaluation results corresponding to the plurality of pieces of content and user input from the client computing device; and
    distributing the at least one subset of the plurality of pieces of content.

2. The computer-implemented method of claim 1, further comprising:
    receiving information indicative of an association between the plurality of pieces of content and the mission event; and
    storing the association between the plurality of pieces of content and the mission event in at least one database.

3. The computer-implemented method of claim 2, wherein the at least one database comprises a plurality of sets of content associated with a plurality of mission events.

4. The computer-implemented method of claim 1, wherein the information indicative of viewer reactions comprises a number of views, a number of likes, a number of shares, and comments on each of the plurality pieces of content.

5. The computer-implemented method of claim 1, further comprising:
    updating the information indicative of the viewer reactions to the plurality of pieces of content.

6. The computer-implemented method of claim 1, further comprising:
    presenting the plurality of evaluation results corresponding to the plurality of pieces of content for display of the plurality of evaluation results on the client computing device.

7. The computer-implemented method of claim 1, further comprising:
    storing the at least one subset of the plurality of pieces of content to at least one database.

8. The computer-implemented method of claim 1, further comprising:
    removing a piece of content from the at least one subset of the plurality of pieces of content; or
    adding a new piece of content to the at least one subset of the plurality of pieces of content.

9. The computer-implemented method of claim 1, further comprising:
    configuring a first interface, the first interface configured to enable the first plurality of client computing devices to participate in the mission event, wherein the first interface comprises at least one of information associated with the mission event or at least one piece of sample content associated with the mission event.

10. The computer-implemented method of claim 1, further comprising:
    configuring a second interface, the second interface configured to enable a second plurality of client computing devices to create a plurality of mission events.

11. The computer-implemented method of claim 1, wherein the plurality of pieces of content comprise a plurality of videos created by at least some of the first plurality of client computing devices.

12. A server computing system for improving efficiency and effectiveness of online missions, comprising:
    at least one processor; and
    at least one memory communicatively coupled to the at least one processor and comprising computer-readable instructions that upon execution by the at least one processor cause the at least one processor to perform operations comprising:
    generating, by a server computing system, a first notification indicative of a mission event and transmitting the first notification to a first plurality of client computing devices, wherein the first notification is generated based on receiving a request comprising one or more predetermined rules of the mission event, wherein the one or more predetermined rules comprise a requirement to display a predetermined item in content to be created;
    generating, by the server computing system, a second notification and transmitting the second notification to at least one of a subset of the first plurality of client computing devices during a process of creating a piece of content, wherein the subset of the first plurality of client computing devices have initiated content creation in response to receiving the first notification, and wherein the second notification indicates that the piece of content in the process of being created fails to comply with the one or more predetermined rules;

receiving, by the server computing system, a plurality of pieces of content associated with the mission event from some of the first plurality of client computing devices;

monitoring and capturing in real time information indicative of viewer reactions to each of the plurality of pieces of content;

sorting the information indicative of the viewer reactions using an algorithm;

evaluating the plurality of pieces of content based on the one or more predetermined rules of the mission event and information indicative of the viewer reactions to each of the plurality of pieces of content;

generating data indicating a plurality of evaluation results corresponding to the plurality of pieces of content;

transmitting the plurality of evaluation results corresponding to the plurality of pieces of content for display on a client computing device that sent the request;

determining at least one subset of the plurality of pieces of content based on the plurality of evaluation results corresponding to the plurality of pieces of content and user input from the client computing device; and distributing the at least one subset of the plurality of pieces of content.

13. The computing system of claim 12, the operations further comprising:
updating the information indicative of the viewer reactions to the plurality of pieces of content.

14. The computing system of claim 12, the operations further comprising:
configuring a first interface, the first interface configured to enable the first plurality of client computing devices to participate in the mission event, wherein the first interface comprises at least one of information associated with the mission event or at least one piece of sample content associated with the mission event.

15. The computing system of claim 12, the operations further comprising:
configuring a second interface, the second interface configured to enable a second plurality of client computing devices to create a plurality of mission events.

16. A non-transitory computer-readable storage medium, storing computer-readable instructions that upon execution by a processor cause the processor to implement operations comprising:

generating, by a server computing system, a first notification indicative of a mission event and transmitting the first notification to a first plurality of client computing devices, wherein the first notification is generated based on receiving a request comprising one or more predetermined rules of the mission event, wherein the one or more predetermined rules comprise a requirement to display a predetermined item in content to be created;

generating, by the server computing system, a second notification and transmitting the second notification to at least one of a subset of the first plurality of client computing devices during a process of creating a piece of content, wherein the subset of the first plurality of client computing devices have initiated content creation in response to receiving the first notification, and wherein the second notification indicates that the piece of content in the process of being created fails to comply with the one or more predetermined rules;

receiving, by the server computing system, a plurality of pieces of content associated with the mission event from some of the first plurality of client computing devices;

monitoring and capturing in real time information indicative of viewer reactions to each of the plurality of pieces of content by the server computing system;

sorting the information indicative of the viewer reactions using an algorithm by the server computing system;

evaluating, by the server computing system, the plurality of pieces of content based on the one or more predetermined rules of the mission event and the information indicative of the viewer reactions to each of the plurality of pieces of content;

generating, by the server computing system, data indicating a plurality of evaluation results corresponding to the plurality of pieces of content;

transmitting, by the server computing system, the plurality of evaluation results corresponding to the plurality of pieces of content for display on a client computing device that sent the request;

determining at least one subset of the plurality of pieces of content based on the plurality of evaluation results corresponding to the plurality of pieces of content and user input from the client computing device; and distributing the at least one subset of the plurality of pieces of content.

17. The non-transitory computer-readable storage medium of claim 16, the operations further comprising:
updating the information indicative of the viewer reactions to the plurality of pieces of content.

* * * * *